(12) United States Patent
Quirk et al.

(10) Patent No.: US 10,255,269 B2
(45) Date of Patent: Apr. 9, 2019

(54) GRAPH LONG SHORT TERM MEMORY FOR SYNTACTIC RELATIONSHIP DISCOVERY

(71) Applicant: Microsoft Technology Licensing, LLC, Redmond, WA (US)

(72) Inventors: Christopher Brian Quirk, Seattle, WA (US); Kristina Nikolova Toutanova, Redmond, WA (US); Wen-tau Yih, Redmond, WA (US); Hoifung Poon, Bellevue, WA (US); Nanyun Peng, Baltimore, MD (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 100 days.

(21) Appl. No.: 15/395,961

(22) Filed: Dec. 30, 2016

(65) Prior Publication Data
US 2018/0189269 A1      Jul. 5, 2018

(51) Int. Cl.
*G06F 17/00*      (2006.01)
*G06F 17/27*      (2006.01)
(Continued)

(52) U.S. Cl.
CPC .......... *G06F 17/2775* (2013.01); *G06F 17/20* (2013.01); *G06F 17/275* (2013.01); *G06F 17/278* (2013.01); *G06F 17/2755* (2013.01); *G06F 17/2785* (2013.01); *G06F 17/30401* (2013.01); *G06N 3/0445* (2013.01); *G06N 3/0454* (2013.01); *G06N 5/022* (2013.01); *G06F 17/271* (2013.01)

(58) Field of Classification Search
CPC ................ G06N 3/084; G06F 17/2705; G06F 17/30684; G06F 17/2247; G06F 17/271; G06F 17/2735; G06F 17/279; G06F 17/30011; G06F 17/30401; G06F 17/30707; G06F 17/30958; G06K 9/00422; G06K 9/00463
See application file for complete search history.

(56) References Cited

U.S. PATENT DOCUMENTS 6,711,585 B1      3/2004    Copperman et al.
7,249,117 B2 *    7/2007    Estes ..................... G06N 5/022
                                                  706/18
(Continued)

OTHER PUBLICATIONS

Hong Li, Sebastian Krause, Feiyu Xu, Andrea Moro, Hans Uszkoreit, Roberto Navigli Improvement of n-ary Relation Extraction by Adding Lexical Semantics to Distant-Supervision Rule Learning 4 ICAART 2015—Proceedings of the 7th International Conference on Agents and Artificial Intelligence, Lisbon, Portugal, SciTePress, 2015.*

(Continued)

*Primary Examiner* — Edgar X Guerra-Erazo
(74) *Attorney, Agent, or Firm* — Merchant & Gould

(57) ABSTRACT

Long short term memory units that accept a non-predefined number of inputs are used to provide natural language relation extraction over a user-specified range on content. Content written for human consumption is parsed with distant supervision in segments (e.g., sentences, paragraphs, chapters) to determine relationships between various words within and between those segments.

21 Claims, 10 Drawing Sheets

(51) Int. Cl.
*G06F 17/30* (2006.01)
*G06F 17/20* (2006.01)
*G06N 3/04* (2006.01)
*G06N 5/02* (2006.01)

(56) References Cited

U.S. PATENT DOCUMENTS

| | | | |
|---|---|---|---|
| 7,356,457 | B2 | 4/2008 | Pinkham et al. |
| 7,809,548 | B2 | 10/2010 | Mihalcea et al. |
| 8,036,464 | B2 | 10/2011 | Sridhar et al. |
| 8,700,589 | B2 | 4/2014 | Tymoshenko et al. |
| 8,775,341 | B1* | 7/2014 | Commons ............ G06N 3/0454 706/20 |
| 9,015,093 | B1 | 4/2015 | Commons |
| 9,176,949 | B2 | 11/2015 | Bullock et al. |
| 9,830,315 | B1* | 11/2017 | Xiao ................... G06F 17/2785 |
| 2005/0267871 | A1* | 12/2005 | Marchisio ......... G06F 17/30672 |
| 2007/0083359 | A1 | 4/2007 | Bender |
| 2011/0270604 | A1 | 11/2011 | Qi et al. |
| 2011/0301942 | A1* | 12/2011 | Collobert .............. G06F 17/271 704/9 |
| 2012/0078918 | A1 | 3/2012 | Somasundaran et al. |
| 2014/0195897 | A1 | 7/2014 | Balinsky et al. |
| 2015/0006501 | A1 | 1/2015 | Talmon et al. |
| 2016/0180215 | A1* | 6/2016 | Vinyals .................. G06N 3/088 706/20 |

OTHER PUBLICATIONS

Mani, et al., "Summarizing Similarities and Differences Among Related Documents", In Journal of Information Retrieval, vol. 1, No. 1-2, Apr. 1999, 35-67 pages.
Erkan, et al., "LexRank: Graph-based Lexical Centrality as Salience in Text Summarization", In Journal of Artificial Intelligence Research, vol. 22, Dec. 2004, 23 pages.
Sha Lei, et al., "Recognizing Textual Entailment via Multi-task Knowledge Assisted LSTM", Retrived From: http://www.cips-cl.org/static/anthology/CCL-2016/CCL-16-088.pdf, Oct. 10, 2016, 14 Pages.
Shu Zhang, et al., "Bidirectional long short-term memory networks for relation classification", In Proceedings of 29th Pacific Asia Conference on Language, Information and Computation., 2015, 6 pages.
Socher,, et al., "Semantic Compositionality through Recursive Matrix-Vector Spaces", In Proceedings of the Joint Conference on Empirical Methods in Natural Language Processing and Computational Natural Language Learning, Jul. 2012, pp. 1201-1211.
Tai, et al., "Improved semantic representations from tree-structured long short-term memory networks", In Proceedings of the 53rd Annual Meeting of the Association for Computational linguistics and the 7th International Joint Conference on Natural Language Processing., Mar. 2015, 11 Pages.
Thien Huu Nguyen, et al., "Employing word representations and regularization for domain adaptation of relation extraction", In Proceedings of the 52nd Annual Meeting of the Association for Computational Linguistics (Short Papers), 2014, 7 Pages.
Yan Xu, et al., "Classifying relations via long short term memory networks along shortest dependency paths", In Proceedings of Conference on Empirical Methods in Natural Language Processing (EMNLP), 2015, 10 Pages.
Yan Xu, et al., "Improved relation classification by deep recurrent neural networks with data augmentation", In Proceedings of COLING 2016, the 26th International Conference on Computational Linguistics : Technical Papers., 2016, 10 Pages.
Yee Seng Chan, et al., "Exploiting background knowledge for relation extraction", In Proceedings of the 23rd International Conference on Computational Linguistics, 2010, 9 Pages.
Yoav Goldberg, et al., "A Primer on Neural 1-7,15 Network Models for Natural Language Processing", Published in The Journal of Artificial Intelligence Research vol. 57, Nov. 2, 2016, 75 Pages.

Zhou Guodong, et al., "Exploring various knowledge in relation extraction", In Proceedings of the 43rd annual meeting on association for computational linguistics, 2005, 8 Pages.
Al-Rfou, et al., "Theano: A Python framework for fast computation of mathematical expressions", In Journal of the Computing Research Repository, May 2016, pp. 1-19.
Bengio, et al., "Learning long-term dependencies with gradient descent is difficult", In Journal of IEEE Transactions on Neural Networks, vol. 5, Issue 2, Mar. 1994, pp. 157-166.
Chris Quirk, et al., "Distant supervision for relation extraction beyond the sentence boundary", Retrieved From: http://www.aclweb.org/anthology/E17-1110, 2016, 12 Pages.
Chris Quirk, et al., "MSR SPLAT, a language analysis toolkit.", In Proceedings of NAACL HLT Demonstration Session., 2012, 4 pages.
Cicero Nogueira Dos Santos, "Classifying relations by ranking with convolutional neural networks", arXiv preprint arXiv:1504.06580., 2016, 9 pages.
Collin F Baker, "The berkeley framenet project", The Proceedings of the 36th Annual Meeting of the Association for Computational Linguistics and 17th International Conference on Computational Linguistics—vol. 1, Aug. 10, 1998, 5 Pages.
Collobert, et al. "A Unified Architecture for Natural Language Processing: Deep Neural Networks with Multitask Learning", In Proceedings of the 25th international conference on Machine learning, Jul. 5, 2008, pp. 160-167., Jul. 5, 2008, pp. 160-167.
Craven, et al., "Constructing biological knowledge bases by extracting information from text sources", In Proceedings of the 7th International Conference on Intelligent Systems for Molecular Biology, Aug. 6, 1999, 10 Pages.
Daojian Zeng, et al., "Distant supervision for relation extraction via piecewise convolutional neural networks", The Proceedings of the 2015 Conference on Empirical Methods in Natural Language Processing (EMNLP), Lisbon, Portugal, 2015, 10 Pages.
Daojian Zeng, et al., "Relation classification via convolutional deep neural networ", In Proceedings of COLING 2014, the 25th International Conference on Computational Linguistics : Technical Papers., 2014, 10 Pages.
Elizabeth Boschee, et al., "Automatic information extraction", The Proceedings of the International Conference on Intelligence Analysis, vol. 71., 2005, 6 pages.
Fabian M Suchanek,, et al., "Combining linguistic and statistical analysis to extract relations from web documents.", The Proceedings of the 12th ACM SIGKDD international conference on Knowledge discovery and data mining, 2012, 6 pages.
Franco Scarselli,, et al., "The graph neural network model", The IEEE Transactions on Neural Networks, 2009, 22 Pages.
Graves, et al., "Speech recognition with deep recurrent neural networks", In Proceedings of IEEE International Conference on Acoustics, Speech and Signal Processing, May 26, 2013, 5 Pages.
Heeyoung Lee, et al., "Deterministic coreference resolution based on entitycentric, precision-ranked rules", Retrieved From: https://web.stanford.edu/~jurafsky/pubs/coli_a_00152.pdf, 2013, 32 Pages.
Hochreiter, et al., "Long Short-Term Memory", In Journal of Neural Computation, vol. 9, Issue 8, Nov. 15, 1997, pp. 1735-1780.
Hoifung Poon, et al., "Distant supervision for cancer pathway extraction from text", Published Pacific Symposium on Biocomputing, 2015, 12 Pages.
Hoifung Poon, et al., "Literome: Pubmed-scale genomic knowledge base in the cloud", Published In : Bioinformatics vol. 30 No. 2014, 3 Pages.
Hong Li, et al., "Improvement of n-ary relation extraction by adding lexical semantics to distant-supervision rule learning.", The Proceedings of the International Conference on Agents and Artificial Intelligence, 2015, 8 Pages.
Jin-Dong Kim, "Overview of bionlp'09 shared task on event extraction", In the Proceedings of the Workshop on Current Trends in Biomedical Natural Language Processing: Shared Task, 2009, 9 pages.
Katsumasa Yoshikawa, et al., "Coreference based event-argument relation extraction on biomedical text", In the Journal of Biomedical Semantics, 2011, 9 pages.

(56) References Cited

OTHER PUBLICATIONS

Kevin Reschke, "Event extraction using distant supervision", Retrieved from: https://nlp.stanford.edu/pubs/rec2014_ds.pdf, 2014, 5 Pages.

Kumutha Swampillai, et al., "Extracting relations within and across sentences", In Proceedings of Recent Advances in Natural Language Processing, 2011, 8 Pages.

Kun Xu, et al., "Semantic relation classification via convolutional neural networks with simple negative sampling", In Proceedings of the 2015 Conference on Empirical Methods in Natural Language Processing., 2015, 5 Pages.

Li, et al. "Gated graph sequence neural networks", In Proceedings of the 4th International Conference on Learning Representations, May 2, 2016, 20 Pages.

Linlin Wang, et al., "Relation classification via multi-level attention cnns", The Proceedings of the 54th Annual Meeting of the Association for Computational Linguistics, 2016, 10 Pages.

Longhua Qian, et al., "Exploiting constituent dependencies for tree kernel-based semantic relation extraction", The Proceedings of the 22nd International Conference on Computational Linguistics-vol. 1, 2008, 8 Pages.

Makoto Miwa, et al., "End-to-End Relation Extraction using LSTMs on Sequences and Tree Structures", In Proceedings of the 54th Annual Meeting of the Association for Computational Linguistics vol. 1: Long Papers, Jun. 8, 2016, 12 Pages.

Manning, et al., "The Stanford CoreNLP Natural Language Processing Toolkit", In Proceedings of the 52nd Annual Meeting of the Association for Computational Linguistics, Jun. 22, 2014, 6 Pages.

Marie-Catherine De Marneffe,, et al., "Generating typed dependency parses from phrase structure parses", In the Proceedings of the Fifth International Conference on Language Resources and Evaluation, 2006, 6 pages.

Martha Palmer,, "The proposition bank: An annotated corpus of semantic roles.", Published in the Journal, Computational Linguistics, vol. 31, Issue 1., 2005, 38 Pages.

Matthew Gerber, et al., "Beyond nombank: A study of implicit arguments for nominal predicates", In the Proceedings of the 48th Annual Meeting of the Association for Computational Linguistics, 2010, 10 Pages.

Michael Roth, et al., "Neural semantic role labeling with dependency path embeddings", In Proceedings of the 54th Annual Meeting of the Association for Computational Linguistics (vol. 1: LongPapers), 2016, 11 Pages.

Michael Wick, et al., "Learning field compatibilities to extract database records from unstructured text", In Proceedings of the 2006 Conference on Empirical Methods in Natural Language Processing, 2006, 9 pages.

Mihai Surdeanu, et al., "Overview of the english slot filling track at the tac2014 knowledge base population evaluation", In Proceedings of the TAC-KBP 2014 Workshop., 2014, 15 Pages.

Mintz, et al., "Distant supervision for relation extraction without labeled data", In ACL '09 Proceedings of the Joint Conference of the 47th Annual Meeting of the ACL and the 4th International Joint Conference on Natural Language Processing of the AFNLP: vol. 2., Jan. 1, 2009, 9 Pages.

Nancy A Chinchor., "Overview of MUC-7/MET-2.", In Proceedings of the Seventh Message Understanding Conference (MUC-7)., 1998, 4 Pages.

Nanda Kambhatla, "Combining lexical, syntactic, and semantic features with maximum entropy models for extracting relations", In Proceedings of the ACL 2004 on Interactive poster and demonstration sessions, 2004, 22 Pages.

Nanyun Peng, et al., "Multi-task multidomain representation learning for sequence tagging", In Proceedings of the 2nd Workshop on Representation Learning for NLP., 2016, 10 Pages.

Nianwen Xue, "The CoNLL-2015 Shared Task on Shallow Discourse Parsing", In Proceedings of the Nineteenth Conference on Computational Natural language Learning: Shared Task, 2015, 16 Pages.

Nicholas Fitzgerald, "Semantic role labeling with neural network factors", In Proceedings of the 2015 Conference on Empirical Methods in Natural Language Processing, 2015, 11 Pages.

Pascanu, et al., "On the Difficulty of Training Recurrent Neural Networks", In Proceedings of the 30th International Conference on Machine Learning, vol. 28, Jun. 16, 2013, 12 Pages.

"International Search Report and Written Opinion Issued in PCT Application No. PCT/US2017/066237", dated May 15, 2018, 23 Pages.

Pennington, et al., "Glove: Global vectors for word representation", In Proceedings of the 2014 Conference on Empirical Methods in Natural Language Processing, Oct. 25, 2014, pp. 1532-1543.

Raymond J Mooney, "Subsequence kernels for relation extraction", In Proceedings of the 18th International Conference on Neural Information Processing Systems, 2005, 8 Pages.

Razvan C Bunescu, et al., "A shortest path dependency kernel for relation extraction.", In the Proceedings of the conference on human language technology and empirical methods in natural language processing, Oct. 2005, 8 Pages.

Rich Caruana, et al., "Overfitting in neural nets: Backpropagation, conjugate gradient, and early stopping.", In Proceedings of the 13th International Conference on Neural Information Processing Systems, 2001, 7 Pages.

Rodrigo Dienstmann, "Database of genomic biomarkers for cancer drugs and clinical targetability in solid tumors", Retrieved From: http://cancerdiscovery.aacrjournals.org/content/candisc/5/2/118.full.pdf, 2015, 7 Pages.

Rui Cai, et al., "Bidirectional recurrent convolutional neural network for relation classification", In the Proceedings of the 54th Annual Meeting of the Association for Computational Linguistics., 2016, 10 Pages.

Ryan McDonald, "Simple algorithms for complex relation extraction with applications to biomedical", In the Proceedings of the 43rd Annual Meeting on Association for Computational Linguistics., 2005, 18 pages.

* cited by examiner

MOBILE COMPUTING DEVICE

GRAPH LONG SHORT TERM MEMORY FOR SYNTACTIC RELATIONSHIP DISCOVERY

BACKGROUND

Queries to databases and file repositories to discover documents therein that contain a given entity or a relationship between entities enable users to search beyond the manually added metadata and the titles of documents. However, users who search documents based on the content included in those documents are limited to finding exact words and relationships between those words to return results, and semantics that are expressed in various ways through natural language are lost in current document searches.

SUMMARY

This summary is provided to introduce a selection of concepts in a simplified form that are further described below in the Detailed Description section. This summary is not intended to identify all key or essential features of the claimed subject matter, nor is it intended as an aid in determining the scope of the claimed subject matter.

Systems and methods are provided herein to enable the semantics inherent to natural language to be extracted from a document to enhance its ability to be searched. The functionality of the systems used to request and perform searches over documents is thus improved to provide more and better results based on the semantic meaning and relationships between words in the documents.

Document contents are parsed using a graph long short term memory (graph LSTM) neural network that extracts cross-sentence n-ary relationships using several graph LSTM units arranged according to the syntactic relations of terms in the segment of text. These syntactic relationships between words are tracked in the graph LSTM neural network to allow artificial intelligence and machine learning techniques to identify entities and their context within the document and from the grammatical structure in which they exist. For example, context that identifies the nouns to which pronouns refer, the adverbs that modify given verbs, the prepositional phrases that affect a given word, etc., are incorporated into the various words to enable more accurate searches of the contents of natural language documents.

Examples are implemented as a computer process, a computing system, or as an article of manufacture such as a device, computer program product, or computer readable medium. According to an aspect, the computer program product is a computer storage medium readable by a computer system and encoding a computer program comprising instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings.

DETAILED DESCRIPTION

Figure 1A:
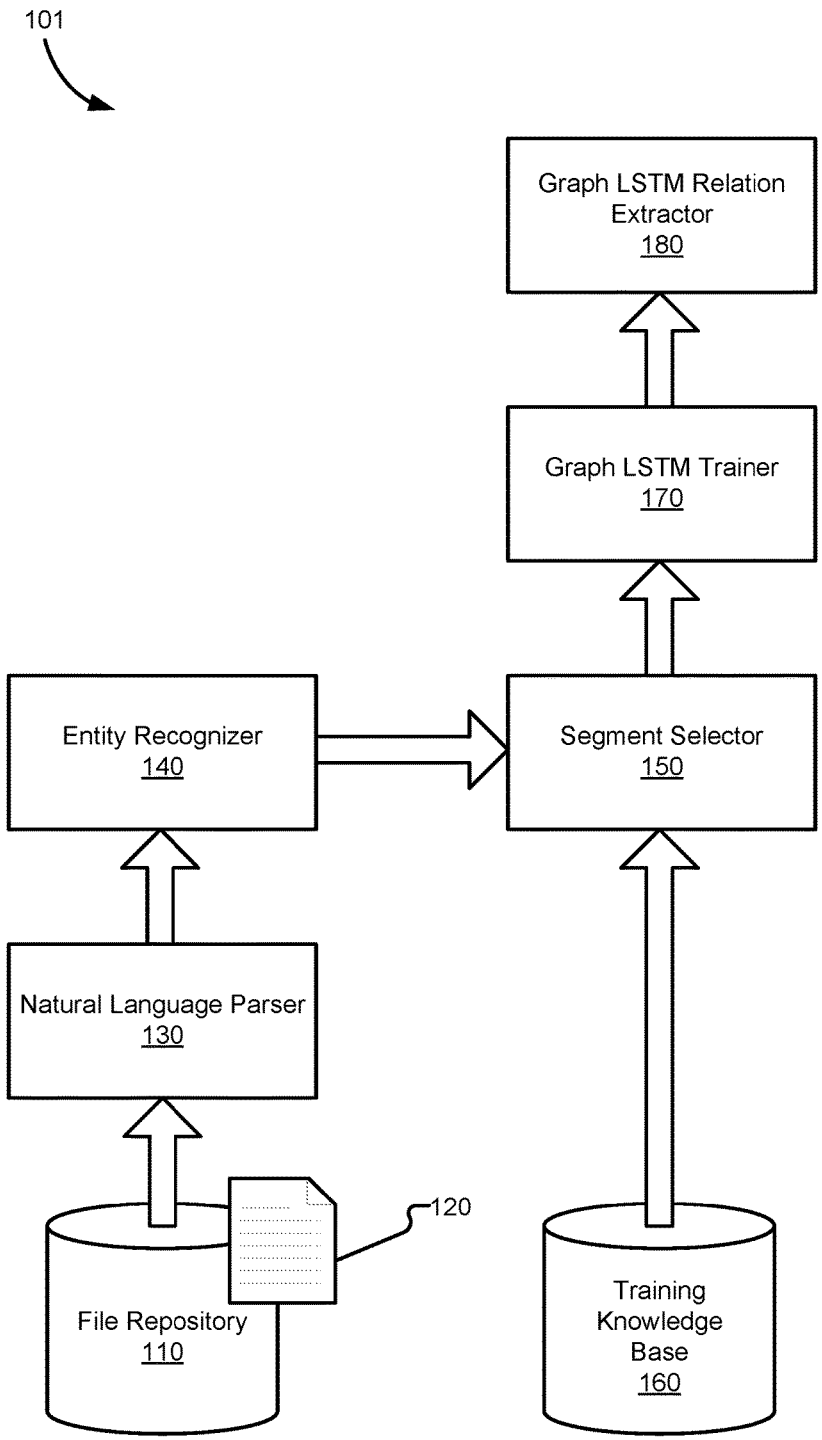
FIG. 1A illustrates an example training environment in which natural language relation extraction may be developed.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

FIG. 1A illustrates an example training environment 101 in which natural language relation extraction may be developed. As illustrated, a file repository 110 contains one or more documents 120 that include natural language content. The natural language content may be divided into one or more segments, such as, words, sentences, paragraphs, chapters, etc., from which a natural language parser (NLP 130) determines the linguistic relationships between words, including syntactic, discourse, and co-reference relationships. Entities are identified in the segments by an entity recognizer 140, which are used by a segment selector 150 to isolate the segments in the document that contain those entities. The segment selector 150 is also in communication with a training knowledge base 160, which contains a set of example structured relations between entities used as a seed by the graph Long Short Term Memory (LSTM) trainer 170 to train a graph LSTM relation extractor 180 to identify un-annotated natural language documents 120 that include the desired relationships between entities.

Figure 1B:
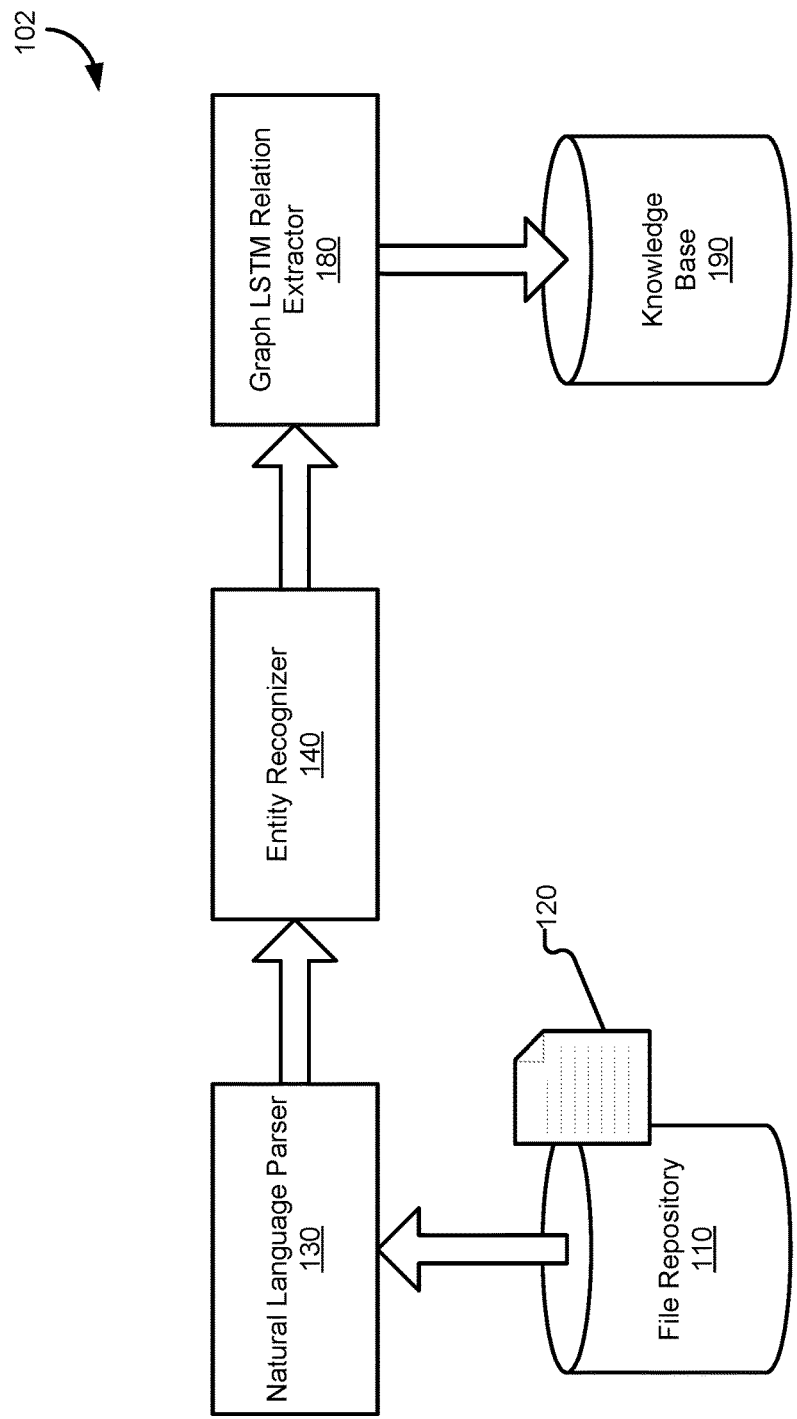
FIG. 1B illustrates an example operating environment in which natural language relation extraction may be practiced.

FIG. 1B illustrates an example operating environment 102 in which natural language relation extraction may be practiced. As illustrated, the file repository 110, containing one or more documents 120, is in communication with the NLP 130, which determines the linguistic relationships between words in the documents 120. The desired entities are identified in the text using the entity recognizer 140. Collections of entities are provided as input to the graph LSTM relation extractor 180 trained according to the training environment 101 of FIG. 1A to identify semantic relationships between the recognized entities, and used to develop a searchable knowledge base 190 to represent those relationships identified from the documents 120 by the graph LSTM relation extractor 180.

The file repository 110, NLP 130, entity recognizer 140, segment selector 150, training knowledge base 160, graph LSTM trainer 170, and knowledge base 190 are illustrative of a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, printers, and mainframe computers. The hardware of these computing systems is discussed in greater detail in regard to FIGS. 6-8.

While the file repository 110, NLP 130, entity recognizer 140, segment selector 150, training knowledge base 160, graph LSTM trainer 170, and knowledge base 190 are shown remotely from one another for illustrative purposes, it should be noted that several configurations of one or more of these devices hosted locally to another illustrated device are possible, and each illustrated device may represent multiple instances of that device (e.g., the file repository 110 may represent multiple devices used to store documents 120). Various servers and intermediaries familiar to those of ordinary skill in the art may lie between the component systems illustrated in FIGS. 1A and 1B to route the communications between those systems, which are not illustrated so as not to distract from the novel aspects of the present disclosure.

The file repository 110 contains one or more documents 120 that include natural language content that a user is enabled to search within. In various aspects the file repository 110 includes file storage solutions that are local to a searching user (e.g., a hard drive of a local device), in a shared network environment to the searching user (e.g., a file server or document management system for an enterprise), or remotely accessible to the searching user (e.g., a cloud-hosted document store, an online encyclopedia, an online document archival service). The documents 120 include, but are not limited to: text files, word processing files, presentation files, note files, spreadsheet files, webpages, and the like.

The NLP 130 is operable to determine the linguistic relationships between words in the documents 120. The context of the words, and how they relate to each other within segments of the documents 120 are identified in part based on the parts of speech, relative position of terms to one another in a segment, and the structure of the segment. Depending on the language used in the documents, the NLP 130 may select from one or more dictionaries to identify various linguistic relationships in the segments.

The selected dictionary provides the functions of various words in natural language for identification by the NLP 130, and acts as a knowledge base to identify the function/part of speech of unlabeled words in the documents 120. For example, the function of various words as nouns, pronouns, adjectives, verbs, adverbs, articles, particles, prefixes, suffixes, conjunctions, comparators, negators, superlatives, etc., are defined in the dictionary. Similarly, rules of grammatical construction are defined in the dictionary (e.g., defining clauses versus sub-clauses, identifying expected positions of verbs in statements versus questions).

Dictionaries are provided for various languages and may be specialized to a given field of endeavor to include terminology that may not be present (or is used differently) than in a standard dictionary for that language. For example, a user may specify a dictionary for a first language (e.g., German) or a second language (e.g., English), or may specify a specialized dictionary in one or more languages (e.g., an English legal dictionary including terms in Latin, a German aerospace dictionary including technical jargon, a Swahili medical dictionary including terms in Greek, English, Latin, and French).

The entities of interest, such as terms submitted in a training data set from the training knowledge base 160 or a search query to the developed knowledge base 190, are identified in the documents 120 by an entity recognizer 140. In various aspects, the segment selector 150 is configured to determine whether a group of references to the entities constitutes a segment. For example, a minimum distance threshold between the entities may have to be satisfied so that a list of keywords without any syntax (e.g., a robot text or glossary) may be rejected as a segment for being too close to one another, despite including all of the entity identifiers. In another example, a maximum distance threshold between the entities may have to be satisfied so that keywords appearing too far apart are not grouped together into a segment for analysis. In other aspects, when the document 120 contains multiple references to the entities, a segment selector 150 is configured to select one group of references as the segment to represent the document 120. For example, when two or more segments include all of the keywords, the segment in which the greatest/smallest distance between the entities, the greatest/smallest number of other words in the segment, the greatest/least amount of punctuation, the closest/furthest from a beginning of the document 120 or section thereof, etc. may be selected as the segment to analyze for the document 120.

The training knowledge base 160 provides keywords representing entities of interest and known relationships between those entities. In various aspects, the known relationships specify a desired relationship to identify in the documents 120, but may represent accurate relationships, inaccurate relationships (to discover fake "news" articles, errors in natural language documents 120, etc.), or relationships whose accuracy is not yet fully understood (e.g., a research paper identifying potential pathways of drug interaction for further research). In some aspects, the known relationship forms the structure for a training neural network of graph LSTM units, which may yield a relational value used as a threshold or target value to determine whether an untrained graph LSTM relation extractor 180 has the weights set for various relationships between graph LSTM units appropriately.

The values of the weights for various relationships are adjusted over a series of training epochs by a graph LSTM trainer 170. The graph LSTM trainer 170 uses distant supervision, based on a number of the segments selected that conform with their expectations relative to matching the known relationship, to adjust the weights used in the graph LSTM units over several epochs of training.

The context of the various entities within segments of the documents 120 are identified in part based on the parts of speech, relative positions of entities to one another in a segment, and the structure of the segment according to a relational diagram or document graph. Relational diagrams are discussed in greater detail in regard to FIG. 3. Each of the words linked in a linguistic structure have their effect on one another controlled by unique weights for their given contextual interaction type, which are adjusted based on how accurately the graph LSTM relation extractor 180 is able to classify the portion of the corpus of documents 120 that are expected to exhibit the known relationship and the portion of the corpus of documents 120 that are expected to not exhibit the known relationship. The graph LSTM trainer 170 adjust these weights over the series of epochs according to one or more machine learning techniques, and may finalize the training of the graph LSTM relation extractor 180 when an epoch limit is reached, an accuracy threshold is reached, or the training process is aborted.

Although examples are given herein primarily in the English language, it will be appreciated that the present disclosure is applicable to languages other than English. Terminology that is not found in the primary language of a dictionary (non-English terminology incorporated into an English language sentence, corruptions of actual terms, newly coined terms, and other unfamiliar terms) may have its context and relationships tracked as would a term found in the primary language of the dictionary. For example, the sentence, "I love Austria during Spargelzeit" includes the German term "Spargelzeit" (a noun meaning asparagus season) in an otherwise English sentence. A user may specify a primary language (English for the above example) and any unfamiliar term, whether in the primary language but not in the dictionary, a secondary language (German for the above example), newly coined, or misspelled or otherwise corrupted, will be identified and treated as a particular part of speech based on the grammar of the primary language. In the above example, "Spargelzeit" would be treated as a noun due to its usage in the example sentence, if, however, the sentence read "I Spargelzeit Austria during springtime", the unfamiliar term ("Spargelzeit") would instead be treated as a verb due to its position in the sentence and/or the lack of other recognized verbs in the sentence as defined in the grammatical rules of the specified dictionary.

A graph LSTM unit is an architecture used in data processing and artificial intelligence, particularly machine learning, that includes memory that may determine when to "remember" and when to "forget" values held in that memory based on the weights of inputs provided to the given graph LSTM unit. Each of the graph LSTM units used herein are configured to accept an unlimited number of inputs from other graph LSTM units to provide relational and sub-relational outputs for terms discovered in the documents 120 that may be used for later searches. Individual graph LSTM units may be chained together and/or organized into tree structures in various configurations of neural networks to provide interactions and relationship learning modeling for how each word in a segment of the natural language text is related to one another.

A graph LSTM unit includes several gates to handle input vectors (e.g., words from the documents 120), a memory cell, and an output vector (e.g., contextual representation). The input gate and output gate control the information flowing into and out of the memory cell, respectively, whereas one or more forget gates optionally remove information from the memory cell based on the inputs from linked cells earlier in the graph LSTM neural network. In linear-chain LSTM networks (as opposed to graph LSTM neural networks), each LSTM unit contains only one forget gate, as it has only one direct precedent (i.e., the adjacent-word edge pointing to the previous word). In graph LSTM neural network, however, a graph LSTM unit may have several precedents, and several antecedents, including connections to the same word via different edges, and therefore multiple forget gates associated with each input, which include edge types beyond adjacent-word edges.

Example formulas are shown below in FORMULAS 1-5 that describe the relationships between the various gates and components of a graph LSTM unit when full parameterization is applied—where all of the potential relationships between words in the segment are tracked and different set of parameters are developed for each edge type are developed. Additional example formulas are shown below in FORMULAS 6-10 that describe the relationships between the various gates and components of a graph LSTM units when partial parameterization is applied—where similar edge types share parameters are "typed" to reduce the number of parameters that need to be developed.

In each of the FORMULAS 1-10, the term $x_t$ represents the input word vector for time t, W represents the weight matrices for the gate, b represents the bias term vectors for each gate, and j represents a predecessor node in the LSTM neural network to a given graph LSTM unit, where P(t) is the set of predecessor graph LSTM units in the linguistic structure. A typed weight matrix $U^{m(j)}$ (where m(j) represents a type mask for predecessor j) is used to incorporate values received from various edge types at various weights. The symbol "O" represents a Hadamard operation between two matrices (multiplexing the two matrices), the symbol "σ" represents a sigmoid squashing functions used to compress the outputs (specifically, very large and very small outputs are compressed more strongly than medial outputs), the symbol "⊗" represents the tensor product, and "$x_\tau$" represents a tensor dot product.

$$i_t = \sigma(W_i x_t + \Sigma_{j \in P(t)} U_i^{m(j)} h_j + b_i) \qquad \text{FORMULA 1:}$$

$$f_{tj} = \sigma(W_f x_t + U_f^{m(j)} h_j b_f) \qquad \text{FORMULA 2:}$$

$$o_t = \sigma(W_o x_t + \Sigma_{j \in P(t)} U_o^{m(j)} h_j + b_o) \qquad \text{FORMULA 3:}$$

$$c_t = i_t \odot \tan h(W_c x_t + \Sigma_{j \in P(t)} U_c^{m(j)} h_j + b_c) + \Sigma_{j \in P(t)} f_{tj} \odot c_j \qquad \text{FORMULA 4:}$$

$$h_t = o_t \odot \tan h(c_t) \qquad \text{FORMULA 5:}$$

The state of an input gate at time t is represented by FORMULA 1, where $i_t$ is the state value, and the sigmoid squashing function σ is applied to the sum of the input weighted word vector ($W_i x_t$) plus the sum of the input typed weight matrix ($U_i^{m(j)}$) for the predecessors multiplied by the predecessor LSTM units' hidden vectors ($h_j$) plus the input bias vector ($b_i$).

The state of a forget gate at time t is represented by FORMULA 2, where $f_t$ is the state value, and the sigmoid squashing function σ is applied to the sum of the forget weighted word vector ($W_f x_t$) plus the forget typed weight matrix ($U_f^{m(j)}$) multiplied by a given predecessor graph LSTM unit hidden vector ($h_j$) plus the forget bias vector ($b_f$). A plurality of forget gates are included in the LSTM unit, where the number of forget gates in based on the number of predecessor LSTM units for related words to the word vector's word that are accepted by the LSTM unit.

The state of an output gate at time t is represented by FORMULA 3, where $o_t$ is the state value, and the sigmoid squashing function σ is applied to the sum of the output weighted word vector ($W_o x_t$) plus the sum of the output typed weight matrix ($U_o^{m(j)}$) for the predecessors multiplied by the predecessor LSTM units' hidden vectors ($h_j$) plus the output bias vector ($b_o$).

The state of the cell memory at time t is represented by FORMULA 4, where $c_t$ is the state value, which is formed from multiplexing the state of the input gate $i_t$ and the hyperbolic tangent of the memory weighted word vector ($W_c x_t$) and the sum of the memory typed weight matrix ($U_c^{m(j)}$) for all of the predecessors multiplied by the predecessor LSTM units' hidden vectors ($h_j$) plus the cell bias vector ($b_c$), to which the sum of the Hadamard products between the state of the multiple forget gates ($f_{tj}$) and the multiple predecessor LSTM units' memory states ($c_j$) is added.

The state of the hidden vector at time t is represented by FORMULA 5, where $h_t$ is the state value, which is formed from multiplexing the hyperbolic tangent of the memory gate's state at time t ($c_t$) and the state of the output gate at time t ($o_t$). The hidden vector is transmitted from the graph LSTM unit to successor graph LSTM units in the graph LSTM neural network (the graph LSTM unit acting as a predecessor graph LSTM unit to the successor graph LSTM unit).

$$i_t = \sigma(W_i x_t + \Sigma_{j \in P(t)} U_i^*_\tau (h_j \otimes e_j) + b_i) \quad \text{FORMULA 6:}$$

$$f_{tj} = \tau(W_f x_t + U_f^*_\tau (h_j \otimes e_j) + j + b_f) \quad \text{FORMULA 7:}$$

$$o_t = \tau(W_o x_t + \Sigma_{j \in P(t)} U_o^*_\tau (h_j \otimes e_j) + b_o) \quad \text{FORMULA 8:}$$

$$c_t = i_t \odot \tan h(W_c x_t + \Sigma_{j \in P(t)} U_c^*_\tau (h_j \otimes e_j) + b_c) + \Sigma_{j \in P(t)} f_{tj} \odot c_j \quad \text{FORMULA 9:}$$

$$h_t = o_t \odot \tan h(c_t) \quad \text{FORMULA 10:}$$

FORMULAS 6-10 correspond to FORMULAS 1-5, where: U is a tensor with dimensions h×h×d; and where ($h_j \otimes e_j$) produces a matrix with dimensions h×d, in which h is the dimension of the hidden vector ($h_j$) and d is the dimension for the edge type embedding ($e_j$). FORMULAS 6-10 are used in addition to or instead of FORMULAS 1-5 to produce the input state, forget states, output state, memory state, and hidden vector, where FORMULAS 1-5 provide for full parameterization and FORMULAS 6-10 provide for edge-type embedding.

The weights (W and U), bias vectors (b), and edge type embeddings ($e_j$) assigned to given inputs are trained over time by the graph LSTM trainer 170 to enable the graph LSTM relation extractor 180 to learn continuous representations of words and their dependencies within segments of natural language. The LSTM trainer 170 uses distant supervision on documents 120 (or segments thereof) known to contain sets of words with known semantic relationships and documents 120 (or segments thereof) that are known or suspected to not contain those sets are used to determine appropriate values to set the weights and bias vectors to. In various aspects, these known sets are provided by the training knowledge base 160. The weights and bias vectors may be adjusted by various machines learning techniques over several runs to meet a confidence score in that the weights and bias vectors developed with the training sets can be applied to other sets of documents 120 or for other sets of words and relationships. In various aspects, the results of the graph LSTM trainer 170 are audited against the training knowledge base 160 or documents 120 from the file repository 110 by a human user, to provide additional curation or error checking.

The given weights of terms in the natural language content of the documents 120 are developed in a document graph produced by the NLP 130 to captures the intra- and inter-segment dependencies of various terms via linguistic analysis, which is fed into the graph LSTM relation extractor 180 for analyzing the linguistic relations within segment for entities of interest. Nodes representing words in the segment are stored in the relational graph and related to other nodes with edges representing various contexts (adjacency/proximity, syntactic dependencies, co-references, and discourse relations). The representation of various edges, or from various nodes are learned over time via feed forward and back propagation of the graph LSTM relation extractor 180, may employ synchronous or asynchronous updates. In some aspects, the document graph is partitioned into a left-to-right directed acyclic graph (DAG) to handle antecedent/precedent relationships and a right-to-left DAG to handle subsequent/postcedent relationships (for left-to-right languages—for right-to-left languages, the reverse pre- and post-cedent relationships hold true).

For example, a user researching whether drug d is effective for patients having a mutation m in gene g, may wish to search a body of medical literature to learn if the literature describes a relation for the tuple (d, m, g). The graph LSTM relation extractor 180 is operable to store this relation as parsed by the NLP 130 as well as sub-relationships, via multi-task learning, for the tuples of (d, m), (d, g), and (m, g).

The graph LSTM relation extractor 180 incorporates the use of cross-segment references and linkages to improve the relationships returned. For example, if the documents 120 parsed by the NLP 130 include the sentences: "Drug d has a variety of therapeutic uses. For example, it is effective for treating condition c for patients with mutation m on gene g.", a single sentence parsing may miss that the pronoun "it" in the second sentence represents drug d, whereas the graph LSTM relation extractor 180 is configured to recognize the relationship extending across the example sentences by various endophors. As will be appreciated, the term endophor includes various referential schemes where one or more words represent one or more other words, including anaphors, cataphors, and self-referential terms. For purposes of the present disclosure, the term endophor is to be understood to include exophors, which are relate to a cedent (ante- or pre-) outside of a given sentence or natural language segment.

In another example, if the documents 120 parsed by the NLP 130 includes the sentences "Patients with mutation m on gene g may be treated for condition c with several drugs. Examples of effective drugs including drugs a, b, c, d, etc.", the graph LSTM relation extractor 180 is also operable to recognize that "several drugs" act as an endophor for each of the example drugs (including drug d) given in the subsequent sentence.

The knowledge base 190 is configured to store a database of relationship data discovered from the documents 120 by the graph LSTM relation extractor 180. The content of the natural language text is parsed to fill various fields of the database that conform to various relationships between and among key terms discovered from the parsed documents 120. The fields from the database are provided for search in response to queries, which may provide results that link to the documents 120 for which the relationships were discovered, a related field, or a derived answer. For example, a user may query a database with several key terms to return a related key term (e.g., a political party and a year of election to return candidate names), which may link the user to the document(s) 120 from which the relationship was discovered, or to determine whether a positive or negative relationship exists among a given set of key terms (e.g., was person A the candidate for party B for the election in year C?—to receive a derived yes or no answer). The database may be built in anticipation to user queries or in response to user queries. In various aspects, the documents 120 from which the database is built may be modified on an ongoing basis to provide additional references and to remove documents 120 from consideration.

The knowledge base 190 is constructed by the graph LSTM relation extractor 180 based on the documents 120 analyzed. In various aspects, the knowledge base 190 may be queried to return results based on a set of entities and a relationship among those entities on which the knowledge base 190 was built. In other aspects, the knowledge base 190 is configured to return results when queried with less than all of the entities of a set or their relationship. For example, a user may query the knowledge base 190 for the entity set of A-B-C having relationship X among the entities, and receive the documents 120 that discuss the entity set according to the specified relationship. In another example, a user may query the knowledge base 190 for what entity shares relationship X with entities A and B, and receive a derived answer of C or documents 120 that discuss entities A and B according to relationship X, which the user may read to discover entity C or other entities. In a further example, a user may query the knowledge base 190 for what relationship exists between entities A-B-C, and receive a derived answer of relationship X or documents 120 that discuss entities A-B-C, which the user may read to discover relationship X or other relationships.

Figure 2:
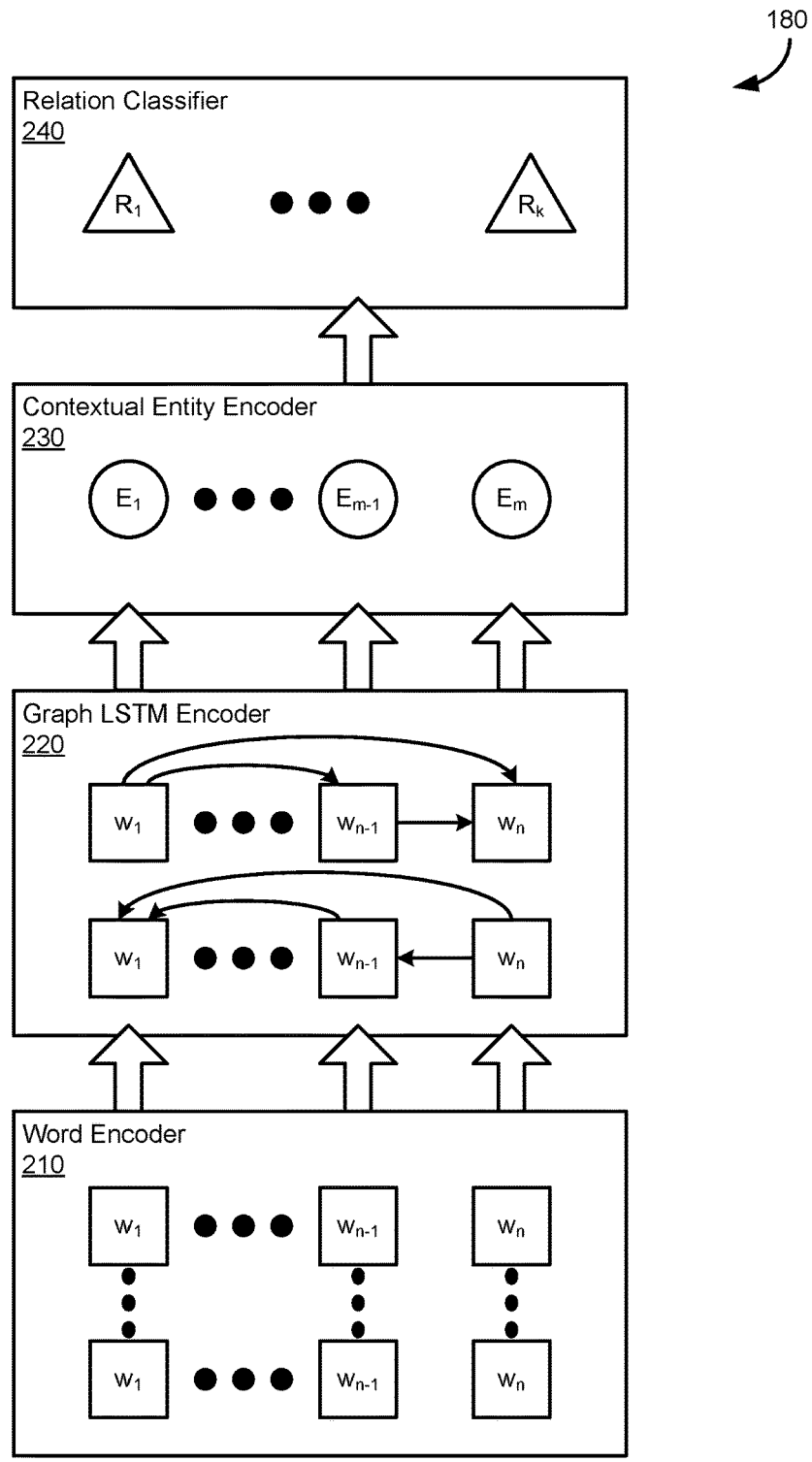
FIG. 2 illustrates an example architecture for the graph long short term memory relation extractor that identifies relationships between entities in natural language text.

FIG. 2 illustrates an example architecture 200 for the graph LSTM extractor 180. As illustrated, a word encoder 210, configured to produce vectors to represent the entities and terms identified from the documents 120, is in communication a graph LSTM encoder 220, configured to contextualize the extracted terms with one another. The graph LSTM encoder 220, in turn, is in communication with a contextual entity encoder 230, configured to narrow the output of the graph LSTM encoder 220 to the queried entities. The contextual entity encoder 230 is in communication with a relationship classifier 240, which is configured to determine whether a relationship exists between the various entities discovered in the natural language text.

The word encoder 210 is configured to receive extracted words from various segments of natural language documents 120. Segments includes portions of the documents that are set apart by punctuation, such as, for example, commas, parentheses (and variations thereof), quotation marks (and variations thereof), full stops/periods, question marks, tabs, line breaks, headings, etc. Individual words may be recognized by spaces between groups of letters; words identified from a dictionary; particles, roots, or constructive markers (particularly when the selected dictionary for used in a highly synthetic and agglutinative language, such as Hungarian or Mohawk); and groups of words that form a single term. For example, the Japanese language does not typically use spaces between words in sentences written in its native character sets, and the word encoder 210 is operable to identify words based on the dictionary and/or particles used between words. In another example, the German term "Spargelzeit" may be identified and extracted as one word or the two words from which it is constructed "Spargel" and "Zeit" (meaning asparagus and time, respectively, to construct "asparagus season"). In another example, various words may be extracted as root words having different prefixes, suffixes, and modifiers applied to that word as recognized from the appropriate dictionary. For example, the English term "retry" may be treated as a single word or as a root word "try" having a repetition prefix "re". In yet another example, a separable term, such as the German verb "Anrufen" (meaning "to call", as on the telephone) or the English term "beat up" may be treated as one word despite appearing in multiples space delineated character groups in the example sentences: "Bitte, ruft mir an" (meaning, please call me) and "The champ beat the challenger up".

In various aspects, the function of the extracted words are identified by the word encoder 210 according to the appropriate dictionary to establish relationships between words in the segments identified that will be tracked with the graph LSTM units. The word encoder 210 builds the graph LSTM neural network for the given segment structure that will be used by the graph LSTM encoder 220 to determine entities within the segment and their relationships. For example, adjacent words may have their graph LSTM units linked in the graph LSTM neural network by the word encoder 210 in one or more directions of the flow of text, prior words linked to later words (in various directions), endophors may be linked to their cedents, sub-clauses linked to their parent clauses, etc. The edges established between word nodes by the word encoder 210 may vary in strength based on the type of edge and/or the distance between nodes in the parsed sentence. For example, an exophor/cedent edge may be given a greater weight than an adjacency edge, which is given greater weight than an edge representing a word n hops away from the node.

Each node is labeled with its lexical item, lemma, and part of speech and includes a vector that represents that word. These extractions and labels for the nodes allow the word "running", for example, to be treated differently but maintain ideographical similarities (as a present participle and a gerund, respectively) in the example sentences: "Running is fun" and "I am running right now".

The word vectors extracted from the natural language text of the document 120 are fed to the graph LSTM units according to the developed graph LSTM neural network by the graph LSTM encoder 220. The graph LSTM neural network include n graph LSTM units, where n corresponds to the number of words extracted from the segment by the word encoder 210. As each LSTM unit receives an associated word vector ($x_t$), a hidden vector ($h_t$) is fed into one or more successor graph LSTM units, and one or more hidden vectors ($h_j$) are received from the predecessor graph LSTM units included in the graph LSTM neural network to develop vectors that incorporate the syntactic meaning imparted by the other words in the segment analyzed. To handle the multiple inputs, each graph LSTM unit includes multiple forget gates, that are each associated with one of the multiple hidden vector inputs it receives, and aggregators (e.g., collections of adder circuits) to aggregate the multiple hidden vectors and forget gate states for use by the input and output gates and the memory cell. In various aspects, the number of forget gates (and therefore relationships) exceeds the number of words extracted from the natural language text. Although primarily described formulaically and programmatically, one of ordinary skill in the art will understand that a graph LSTM unit may also be implemented in hardware. As illustrated in FIG. 2, the several LSTM units are configured, in some aspects, to partition the document graph into right-to-left and left-to-right DAGs to handle precedent and postcedent relationships separately. In other aspects, the precedent and postcedent relationships are handled jointly.

The graph LSTM encoder 220 learns the contextual representation of each word, which includes the dependencies of words affecting one another across the segment. A certain subset of the terms are designated as entities of interest (e.g., via a query tuple), and the output vectors ($o_t$) from each graph LSTM unit representing those terms of interest are passed to the contextual entity former 230 to develop contextual entities (E) for each unique entity of interest in the segment. The entities of interest may be designated from a training knowledge base 160, supplied in a query to the developed knowledge base 190, or include related terms to those supplied in the training knowledge base 160 or query, such as, for example, synonyms, genericized names (e.g., aspirin and acetylsalicylic acid), abbreviations/initializations/formulations (e.g., water and $H_2O$, Institute of Electrical and Electronics Engineers and IEEE), spelling differences (e.g., Aluminum and Aluminium), and other known equivalents for referring to a given entity.

In various aspects, the number of entities discovered is less than the number of words extracted from the segment, for example, a noun and its associated pronouns may be represented by a single entity, or multiword entities may be present in the segment. In various aspects, entities that include more than one word are represented by the average values of the word vectors for the component words. The graph LSTM units are trained to give greater weight to various semantic relationships (received as hidden vectors) of predecessor terms so that differences in sentence structures and composition will not affect the values of output states as much as relevant semantic and syntactic relations. For example, structuring a sentence in the active voice or the passive voice will produce similar output states for the graph LSTM relation extractor 180 for key terms in the analyzed segment.

The vectors produced for the contextual entities are concatenated to form relationship vectors (R) by the relationship classifier 240, which in turn are trained with backpropagation to enable the natural language text to be searched for relationships. The relationship vectors developed from known positive segments and the relationship vectors developed from known (or suspected) negative segments are compared against the output of the training query tuple to determine whether the values used to weight the various inputs to the graph LSTM units to produce differentiable values for segments that do and do not embody a relationship for the keywords included in the query tuples. In various aspects, the relationship classifier 240 develops the relationships over a given number of epochs or until a confidence score in the effectiveness of the weights for the graph LSTM units is reached in the accuracy of the relationships relative to a training dataset.

Figure 3:
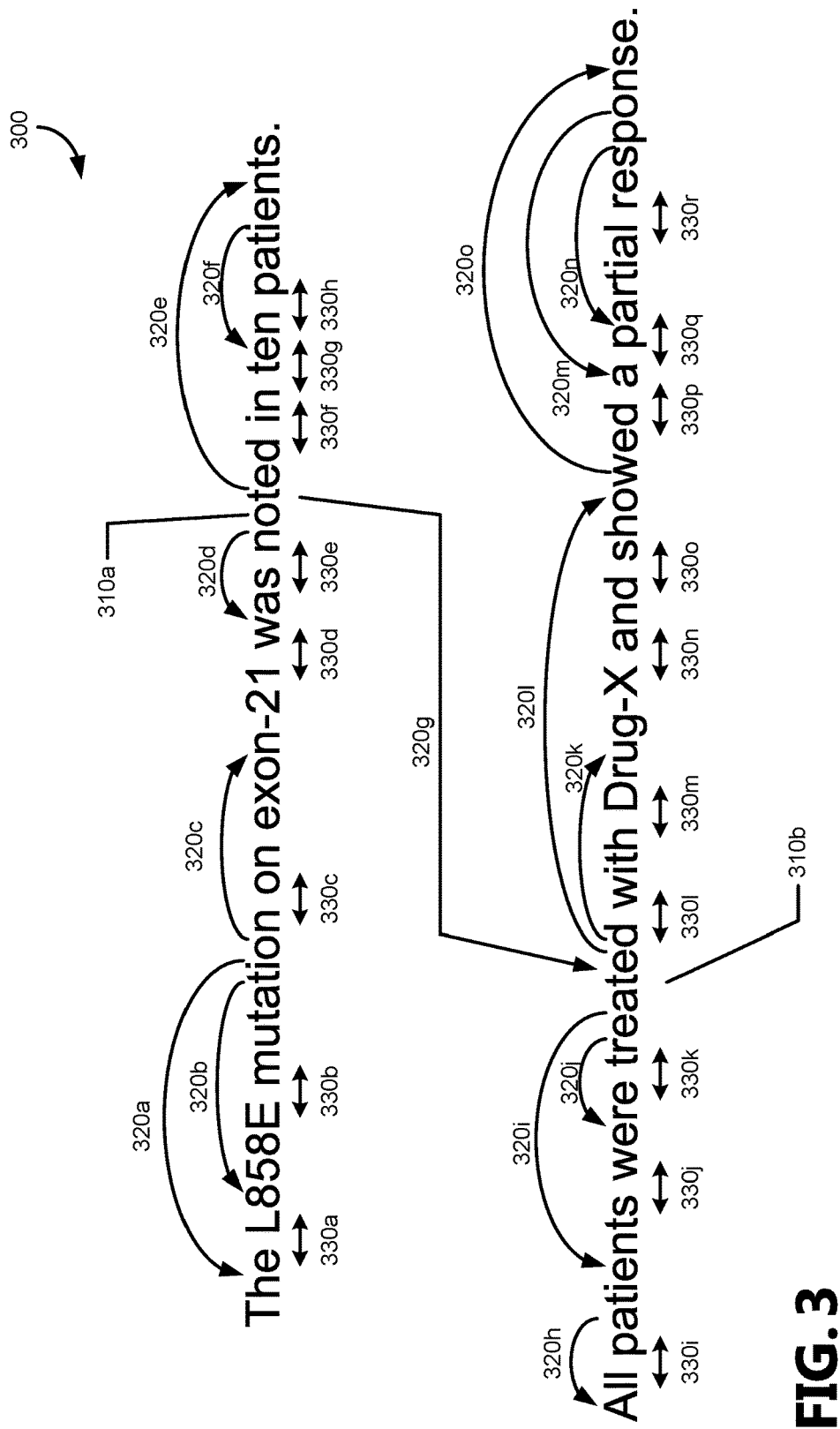
FIG. 3 illustrates a sentence diagram showing linguistic relationships among words in a segment including two sentences.

FIG. 3 illustrates a sentence diagram 300 showing linguistic relationships among words in a segment including two sentences. The linguistic relationships are described in relation to FIG. 3 according to Stanford Dependencies for an English language sentence, but it will be appreciated that these are given as non-limiting examples; the present disclosure may be practiced with other dependency models and languages. As illustrated in FIG. 3, a segment that includes natural language text of two sentences including is shown with several sentence roots 310, linguistic relations 320, and adjacency relations 330, which are distinguished via letter designators (e.g., first sentence root 310a, third linguistic relation 320c, eighth adjacency relation 330h, etc.).

The example sentences have been selected as a segment based on the sentences containing the keywords specified in a query tuple. In various aspects, when a document 120 includes multiple segments that include the keywords, the segment in which the keywords are closest together is selected as the segment to analyze. Segment size bounds may set a maximum distance between keywords to identify a segment and set whether that a segment must include an entire natural language division (complete clauses, whole sentences, entire paragraphs, etc.). In the illustrated example, the query tuple includes the keywords of "L858E", "exon-21", and "Drug-X", which are contained in two sentences to form a cross-sentence segment for analysis.

When forming a graph LSTM neural network for analyzing the segment, the linguistic structure of the segment is used to construct how the graph LSTM units relate to one another to form the graph LSTM neural network. Each graph LSTM unit of the graph LSTM neural network is associated with one word from the segment, and receives the vector associated with that word as its word vector in its input gate, output gate, memory cell, and forget gates. Each graph LSTM unit also receives the hidden vectors produced by each predecessor graph LSTM unit at an associated forget gate and will multiplex the memory state of the associated predecessor graph LSTM unit to produce its memory state. Each forget gate is operable to maintain an independent forget state and weight the hidden vector received from the associated predecessor graph LSTM unit according to the dependency type of the associated predecessor graph LSTM unit. For example, the word "noted" in the example illustrated in FIG. 3 includes dependencies for the words "was" in semantic relation 320d and adjacency relation 330e, "in" in adjacency relation 330f, and "patients" in semantic relation 320e.

The dependencies among various words are determined according to the NLP 130 and the dictionary used, which identifies various words/terms and punctuation as having various semantic and syntactic functions within a natural language segment. In various aspects, the dependencies may be built "forward" or "backward" in the natural flow of the segment (e.g., as a DAG) or bi-directionally. For example, a forward DAG graph LSTM neural network may include the adjacency relations 330, the third semantic relation 320c, fifth semantic relation 320e, eleventh semantic relation 320k, twelfth semantic relation 329l, and fifteenth semantic relation 329o. In another example, a backward DAG may include the adjacency relations 330, the first, second, fourth, sixth, eighth, ninth, tenth, thirteenth, and fourteenth semantic relations 320a,b,d,f,h,i,j,m,n.

Depending on the dependency type of the relationship, the forget gates may apply different forget weights to the hidden vectors received from the predecessor graph LSTM unit associated with those words. For example, for the graph LSTM unit associated with the word "mutation", the forget weight applied for adjacent words may be equal to determiners, but lower than the forget weight applied for words related by prepositions, and noun modifiers may be given the highest weights. For the given example therefore, the graph LSTM unit for "mutation" will have five forget gates in a bi-directional implementation, associated with the two adjacency relations 330c and 330d, the determiner linguistic relation 320a, the noun modifier linguistic relation 320b, and the preposition linguistic relation 330c. As will be appreciated, more than one forget gate may receive the same hidden vector from a given predecessor graph LSTM unit when that graph LSTM unit embodies more than one linguistic or adjacency relationship (as "L858E" does for "mutation" in the present example).

The two sentences in FIG. 3 are linked into a segment by their sentence roots 310 via seventh linguistic relation 320g; "noted" and "treated" as illustrated. In various aspects, other natural language roots, such as, for example, a paragraph root, may be used to link other natural language division into a segment. Any endophors in one natural language text division (e.g., a sentence) that are linked into a segment will be parsed to determine the cedent that they represent. For example, if the second sentence were to read as "All patients were treated with Drug-X and showed a partial response to it.", the endophor of "it" would be parsed relative to the other terms in the sentence to determine that the cedent of "it" would be "Drug-X". Similarly, if the second sentence were to read as "All patients with it were treated with Drug-X and showed a partial response.", the endophor of "it" would be parsed relative to the other terms in the sentence to determine that the cedent of "it" would be the "L858E mutation" from the first sentence.

Figure 4:
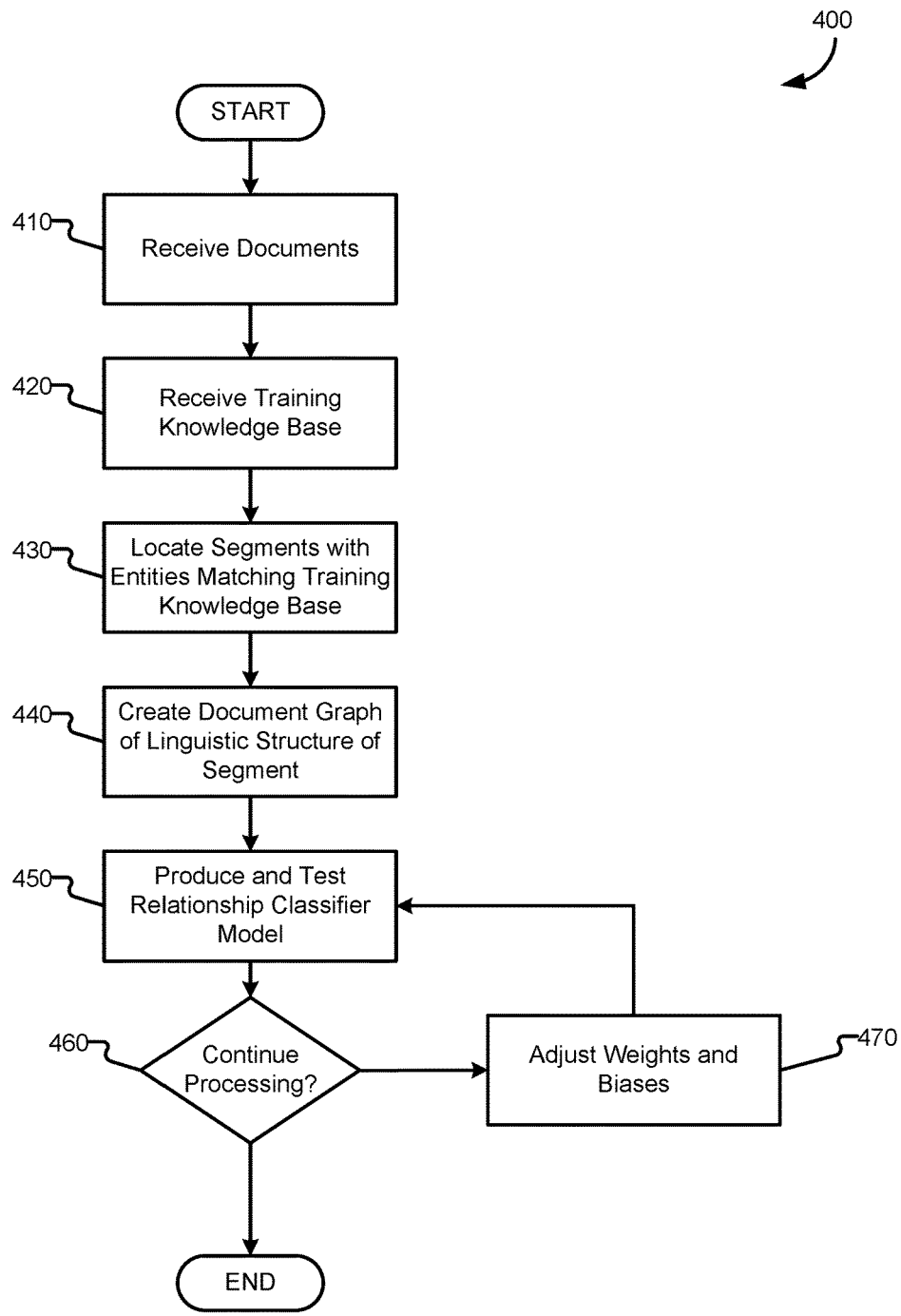
FIG. 4 is a flow chart showing general stages involved in an example method for recognizing semantic relationships in natural language text by training graph Long Short Term Memory units.

FIG. 4 is a flow chart showing general stages involved in an example method 400 for training a graph LSTM relation extractor 180 for recognizing syntactic relationships in natural language text by training graph LSTM units. Method 400 begins with OPERATIONS 410 and 420, where a corpus of documents 120 and a training knowledge base 160 are received, respectively. In various aspects, the training knowledge base 160 includes segments of natural text grouped into training sets of positive examples and negative examples that are respectively known to include and are suspected to not include relationships of various types. In other aspects, the training knowledge base 160 includes a table representing known relationships between specific entities of interest.

Proceeding to OPERATION 430, the documents 120 are parsed to locate the segments in the documents 120 that include entities matching those in the training knowledge base 160. In various aspects, in addition to direct matches, the entities are located according to a dictionary or other knowledge base that identifies equivalents terms (e.g., brand names and generic chemical names for drugs). In other aspects, a segment size may specify a minimum or maximum distance between the entities in a segment that will be extracted from the document 120. For example, if two runs of text in a given document 120 include all of the entities, the run of text with the smallest distance between the entities may be selected to represent the document 120. In another example, if a given document 120 includes each of the entities, but each of the entities appear in separate paragraphs, a segment may not be extracted from the document 120 due to the large distance between the entities in the text of the document 120.

At OPERATION 440 the graph of the syntactic structure of the segment is determined to provide the connections between the various terms in the segments being analyzed when building the graph LSTM neural network. For example, the graph LSTM units of adjacent terms in the segment are connected so that the graph LSTM neural network will feed the hidden vector of a predecessor graph LSTM unit into the subsequent graph LSTM units. In another example, the object of a verb has the graph LSTM unit associated with the verb fed into the graph LSTM unit associated with the object, so that the object incorporates the verb's hidden vector into its analysis of the object. In a further example, the object in the above example has its hidden vector fed into the graph LSTM unit associated with the verb for which it is the object of. The graph LSTM neural network may include one or more DAG implementations or a bi-directional implementation of the syntactic structure of the segment being analyzed.

The weights associated with the word vectors associated with each graph LSTM unit and the hidden vectors received from predecessor graph LSTM unit in the graph LSTM neural network are applied at OPERATION 450 to produce and test a relationship classifier model. In various aspects, each type of gate of the graph LSTM unit (an input gate, an output gate, a memory cell, and a plurality of forget gates) is associated with its own weights and bias vectors, but the values of those weights and bias vector are the same for each of the graph LSTM unit in the LSTM neural network. For example, an input weight (for an input gate to apply to the word vector) may be different from an output weight (for an output gate to apply to the word vector), but a first graph LSTM unit and a second graph LSTM unit will share the same values for their input weights and output weights. Similarly, a forget gate associated with an adjacent word relationship may apply a first forget weight to the hidden vector it receives, and a forget gate associated with a direct object may apply a second forget weight to the hidden it receives (if applicable), but a first graph LSTM unit and a second graph LSTM unit will share the same values for their first and second forget weights.

At DECISION 460 it is determined whether to continue processing the corpus of natural language text received from the documents 120. In various aspects, the weight values are adjusted over a series of epochs to produce a more accurate model by which to search a corpus of documents 120 for relationships. It may be determined to stop processing the text when the number of epochs satisfies an epoch threshold (e.g., run for n epochs) or when an accuracy threshold is satisfied (e.g., at least n % accuracy in differentiating whether a relationship exists). The accuracy of the graph LSTM relation extractor 180 is determined for a given set of values by comparing the relationships that the model produces against natural language segments that are known to discuss a given relationship between keywords (positive training segments) and/or natural language segments that are known to not discuss a given relationship between keywords (negative training segments). The training segments are provided from the training knowledge base 160, and in some aspects may be expanded to include the corpus of natural text from the file repository via human curation. When subject to human curation, the determinations of whether a relationship exists from the graph LSTM relation extractor 180 for the segments identified from the documents 120 are examined and manually subject to approval or rejection by a human reviewer.

In various aspects, several sets of values for the weights and biases may be evaluated during a given epoch (e.g., a forest model), and a given set may be terminated before the end of the epoch evaluation to preserve computing resources when it is apparent that the given set is not performing as accurately as the other sets being evaluated in the epoch. In additional aspects, accuracy thresholds are used to stop the evaluation early (e.g., before n epochs have been evaluated) when it is determined that the one of the sets of values has an accuracy sufficiently high to not require another epoch.

In response to determining at DECISION 460 to not continue, method 400 concludes, and the graph LSTM relation extractor 180 is made available for constructing a knowledge base 190 with its current values for weights and bias vectors.

In response to determining to continue at DECISION 460, method 400 proceeds to OPERATION 470, where the values of the weights and bias vectors are adjusted. The weights and bias vectors may be adjusted according to several machine learning techniques and implementations, which will be familiar to those of ordinary skill in the art. One or more variations on the current values of the weights and bias vectors may be used to select newly adjusted values, such as, for example, in an evolutionary process, wherein the sets of values that produce the most accurate model are combined to produce adjusted values. In another example, the newly adjusted values are randomly chosen or adjusted from the current values, such as, for example, in a random walk or a "mutation" in an evolutionary process. Once the weight values are adjusted, method 400 returns to OPERATION 450 to apply the newly adjusted weights and bias vectors to the inputs to further refine the natural language relationship classifications for search.

Figure 5:
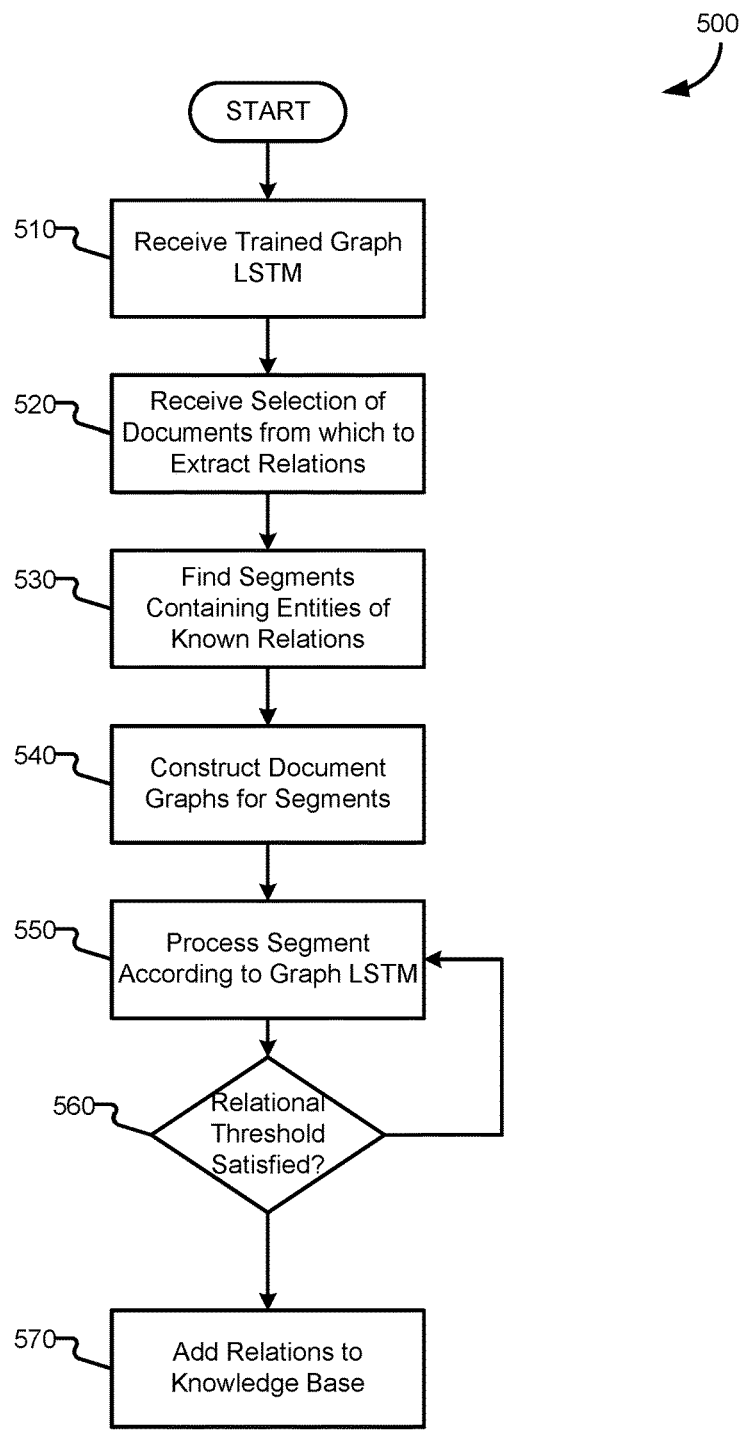
FIG. 5 is a flow chart showing general stages involved in an example method for employing graph Long Short Term Memory units to discover semantic relationships from natural language text.

FIG. 5 is a flow chart showing general stages involved in an example method 500 for employing trained graph LSTM units to populate a knowledge base 190 that may be queried to discover syntactically related terms from natural language text. Unlike content-only searches, which determine the members of a search corpus that contain the desired terms, or a structural search, which determines whether the members of a search corpus that contain the desired terms within set distances of one another, a syntactical search enables a user to find members of a search corpus in which the specified terms interact with one another in natural language according to a specified relationship. For example, the search tuple of "drug—gene—mutation" may be searched for in a corpus of medical literature, such that a paper that mentions the terms in close proximity without interaction among the terms, for example, in a vocabulary section of the paper, will not be returned, whereas a paper that mentions the tuple, even across natural language segments (sentences, paragraphs, etc.) or not in close proximity (e.g., after a lengthy parenthetical aside), will be returned.

Method 500 begins at OPERATION 510, where a trained graph LSTM relation extractor 180 is provided. In various aspects, the graph LSTM relation extractor 180 is trained for a given corpus of documents 120 or a given set of key terms and relationships, such as described in relation to FIG. 4. For example, a first graph LSTM relation extractor 180 may be trained for a corpus of chemistry research to be searchable for catalysts for reactions between various reagents, whereas a second graph LSTM relation extractor 180 is trained for a corpus of biology research to be searchable for chaperone proteins that help hasten the folding of various proteins. The weights applied to word vectors and hidden vectors received from other graph LSTM unit (singly for each forget gate or summed for each input gate, output gate, and memory cell) are trained to provide a generalized classification model, so that several instances of graph LSTM units are organized into a neural network structure based on the linguistic structure of the natural language text to analyze for relationships.

The documents 120 from which to extraction relationships are specified at OPERATION 520. A user may use the corpus of documents 120 against which the graph LSTM relation extractor 180 has been trained or may specify one or more file repositories 110 or documents 120 to use in addition to or instead of the training corpus.

Proceeding to OPERATION 540, the selected documents 120 are parsed to develop document graphs matching their structures. In various aspects, a size of a segment is limited to a number of divisions in the natural language text of the selected documents 120. For example, a segment may comprise a group of up to n adjacent sentences, (or paragraphs, chapters, etc.). In response to discovering one or more segments that contain the entities of interest, the segment in which the keywords are located closest to one another (e.g., with the fewest divisions spanned, with the lowest average number of words between the keywords) will be selected. In various aspects, endophors are matched with their cedents (e.g., pronouns, whether antecedent or subsequent are treated as the nouns that they represent) so that endophors are replaced in the analysis by the word or words they represent. For example, the endophor "it" may refer many nouns that are introduced earlier or later in the segment, and the endophor is handled as the cedent nouns to which "it" refers. The relations between each of the terms in the segment are mapped so that the structure of the graph LSTM neural network will match that of the document graph.

At OPERATION 550 the segment is processed according to the graph LSTM relation extractor 180 to produce a relational score. The linguistic structure of the segment is used to structure several instances of the graph LSTM unit, such that a graph LSTM unit is associated with each word of the segment and the syntactic and other linguistic relations among the words of the segment are used to link the several instances of the graph LSTM units in a neural network. Each instance of the graph LSTM unit receives a word vector based on its associated word as input, and receives inputs from predecessor graph LSTM units of their memory states and hidden vectors. Similarly, each graph LSTM unit provides its hidden vector and memory state to successor graph LSTM units in the semantic structure to use as inputs from predecessor graph LSTM units.

The forget gates of each instance of the graph LSTM unit are associated with one predecessor graph LSTM unit and is weighted according to the dependency type of the predecessor graph LSTM unit to the given graph LSTM unit. For example, a hidden vector received from a predecessor graph LSTM unit associated with an adjective or adverb may have a first weight applied whereas a hidden vector received from a predecessor graph LSTM unit identified as a direct object may have a second weight applied, etc. In various aspects, a given graph LSTM unit may provide inputs to multiple forget gates, such as, for example, when a term shares multiple linguistic relations with a given word (e.g., is both adjacent and an adjective). Additionally, depending on the directionality in how a segment is parsed, a first instance of the graph LSTM unit may be related to a second instance as a predecessor, a successor, or both in various parsings.

The output vectors of the instances of the graph LSTM units associated with the keywords are concatenated to produce a relational score for the keywords, that are compared to a relational threshold at DECISION 560 to determine whether the relational score is sufficient to indicate that the segment includes the queried-for relationship.

In various aspects, the relational threshold is based on a range from a relationship score derived from the query tuple. A keyword tuple of n members is handled by n instances of the graph LSTM relation extractor 180 trained to recognize a given relationship to produce a keyword relationship score. Relationship scores derived from the keywords found in the segments are compared to the keyword relationship score, and those relationship scores within a given range (e.g., n % of the keyword relationship score or with a value within ±n of the keyword relationship score) are determined to satisfy the relational threshold.

For example, the three sentences of "Aspirin helps elderly patients reduce the risk of heart attack.", "Aspirin aids elderly patients in reducing the risk of heart attack.", and "The risk of heart attack is reduced in elderly patients who regularly use aspirin" may be identified the documents 120 based on the keyword tuple of drug ("aspirin"), condition ("heart attack"), and population ("elderly"). The keyword tuple is fed into the graph LSTM relation extractor 180, as are the discovered segments. Each word in the discovered segments affects the other, but the graph LSTM relation extractor 180 has been trained to prioritize the effect of words having particular semantic relationship with one another so that regardless of the sentence structure (e.g., defining one or another keyword as the subject or object of a sentence) or different word choices in non-keywords (e.g., "helps" versus "aids"), the semantic and syntactic relationships will be discovered.

Continuing the example, with a trained graph LSTM relation extractor 180, each of the above example sentences will produce similar output vectors for each of the keywords of "Aspirin", "heart attack", and "elderly" as each of the keywords interact similarly in each of the example segments. Conversely, a segment that includes the keywords, but uses them in different capacities and relationships with one another will produce dissimilar output vectors. For example, the sentence "I almost had a heart attack when I saw my elderly neighbor eating aspirin like candy." includes the keywords of "Aspirin", "heart attack", and "elderly", but the semantic relations among the words are different from the above example sentences, and the output vectors produced by the graph LSTM relation extractor 180 associated with the keywords will therefore differ.

When the relationship score for a given segment satisfies the relationship threshold, method 500 proceeds to OPERATION 570 to add the discovered relationship to the knowledge base 190 and optionally returns to OPERATION 550 to continue processing segments to identify additional responsive segments. When the relationship score for the given segment does not satisfy the relationship threshold, method 500 returns to OPERATION 550 to process other segments to identify whether they are responsive to for the keyword relationship set, or to try additional keyword relationship sets.

At OPERATION 570 the document 120, segment thereof, or a derived answer to a relational query is added to the knowledge base 190, so that in response to a query related to one or more of the keywords, a responsive result may be returned. In various aspects, when a segment is determined to be responsive, the segment may be provided to a requesting user for manual review, or a hyperlink to the document 120 in which the segment was discovered is provided to the requesting user. In various aspects, the tuples of keywords that are extracted from the natural text document's 120 by the graph LSTM relation extractor 180 have their values stored in the knowledge base 190 indicating whether a probability that they express a relationship.

In one example, a knowledge base 190 with the names of United States presidential candidates, their political parties, and year of the election cycle is built from the natural language text of news articles. For example, a document 120 may state: "The Whig party candidate in 1836 was William Harry Harrison. He was also the candidate in 1840.", from which the trained graph LSTM relation extractor 180 will recognize the pronoun "He" relates to "William Harry Harrison" and can fill the databased for both "1836-Whig" and "1840-Whig" with the nominee field value of "William Harry Harrison". A user may search the knowledge base 190 to locate a given field's value or a derived response thereof (e.g., "Who was the Whig Party Candidate in 1840?", "Which parties ran candidates in 1840", "What party did William Harry Harrison run under in 1840?", "Was Harrison the Whig party candidate in 1840?") or to receive hyperlinks to the documents 120 from which the relationships were discovered. In this example, when relationships to presidential candidacy for named persons, parties, and years are discovered, those names, parties, and years are added to the database, without the database requiring human supervision to fill the data fields or supply candidate names or years for which to search the LSTM relation extractor 180 has been trained to identify the relevant relationships are data to provide the classified relationships and the components terms for inclusion in the knowledge base 190 when the documents 120 are analyzed.

In various aspects, the graph LSTM relation extractor 180 may be trained for more keywords in a training tuple than are supplied in a query tuple; enabling multi-task learning and searching of the knowledge base 190. For example, the provided LSTM relation extractor 180 may be trained on a triple of interacting keywords (e.g., drug-gene-mutation interactions), but the queries to the developed knowledge base 190 may supply a duo of the interacting keywords (e.g., drug-gene, gene-mutation, and drug-mutation interactions).

Once the knowledge base 190 is constructed, method 500 may then conclude.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 6:
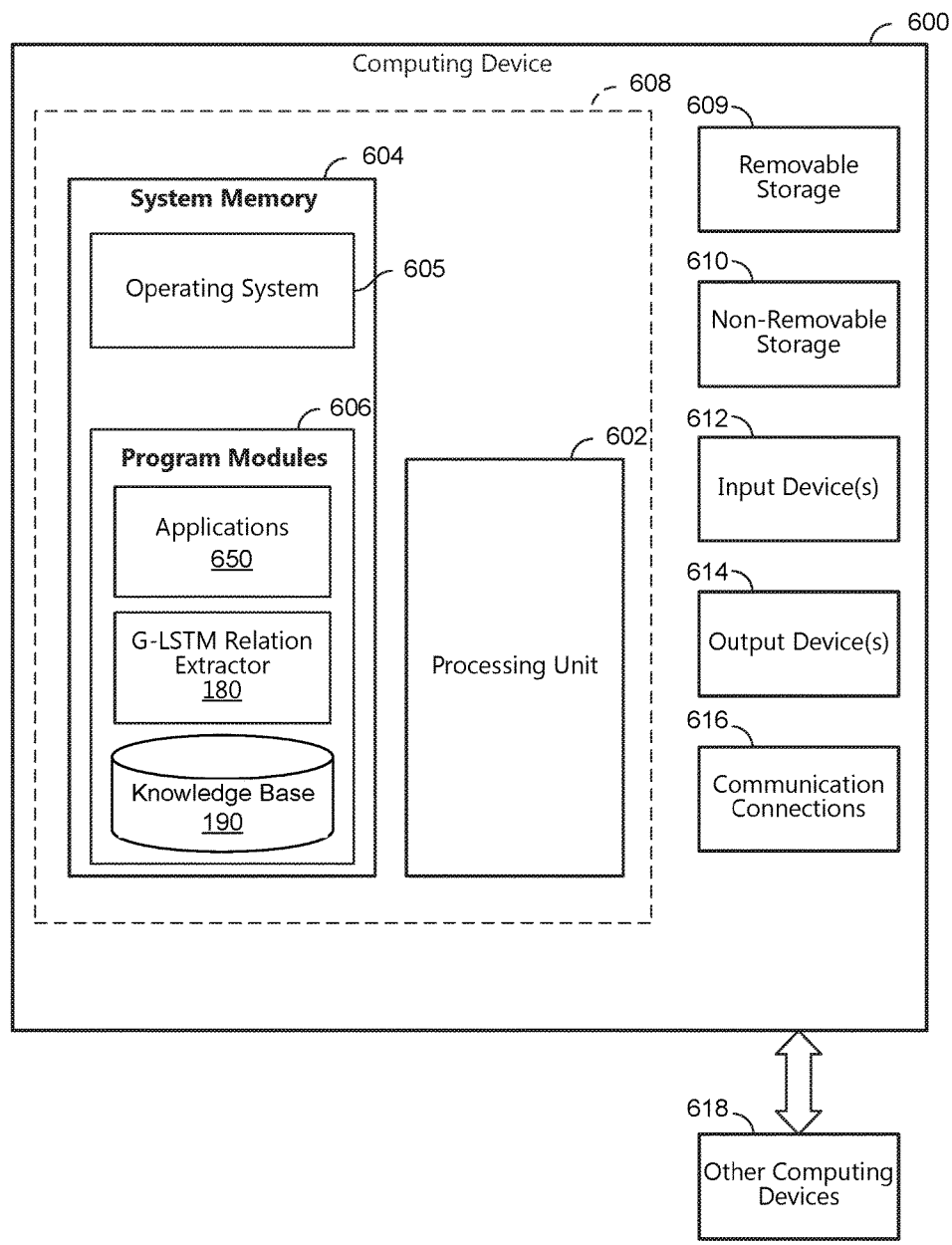
FIG. 6 is a block diagram illustrating example physical components of a computing device.
Figure 7A:
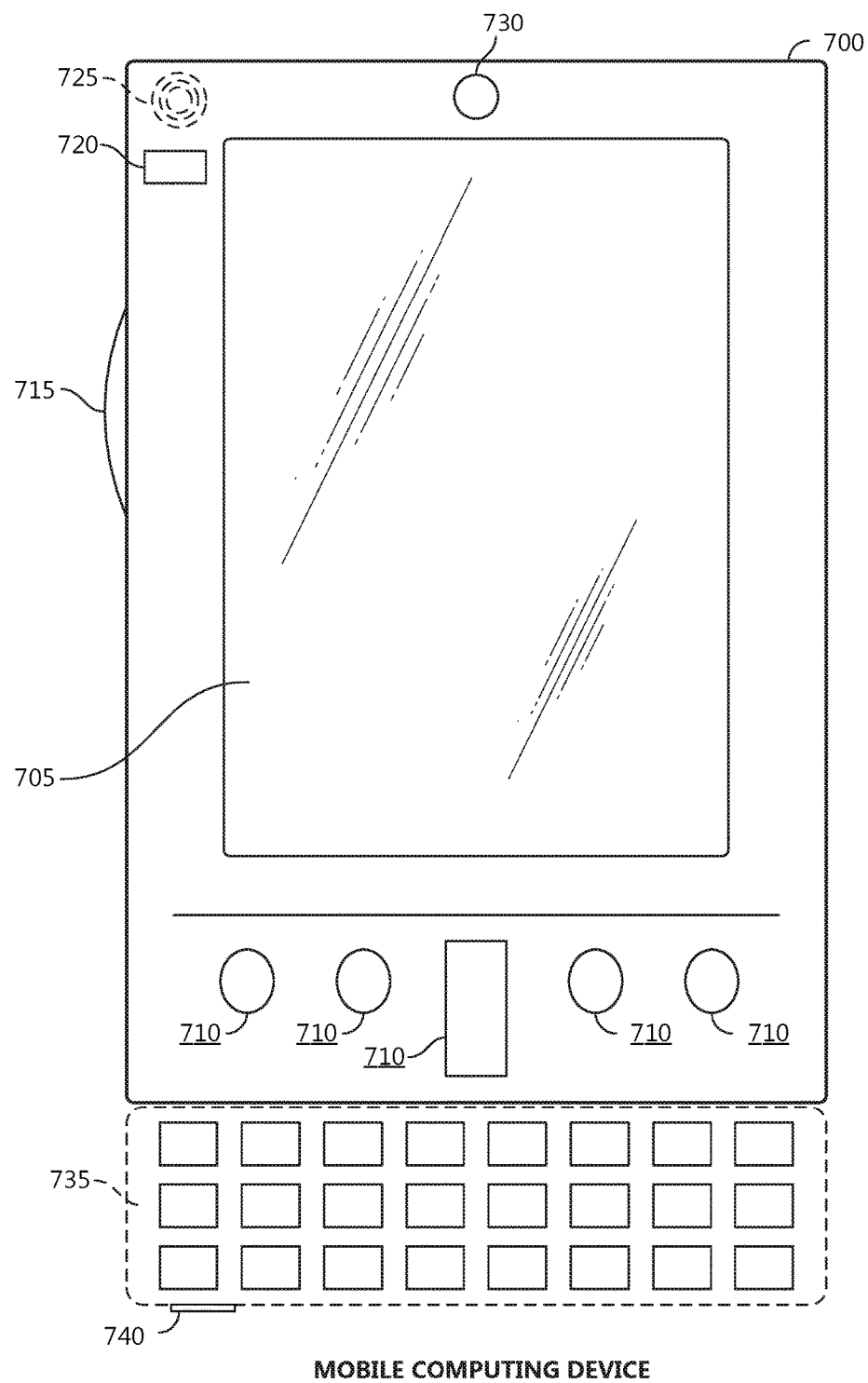
FIGS. 7A and 7B are block diagrams of a mobile computing device.
Figure 7B:
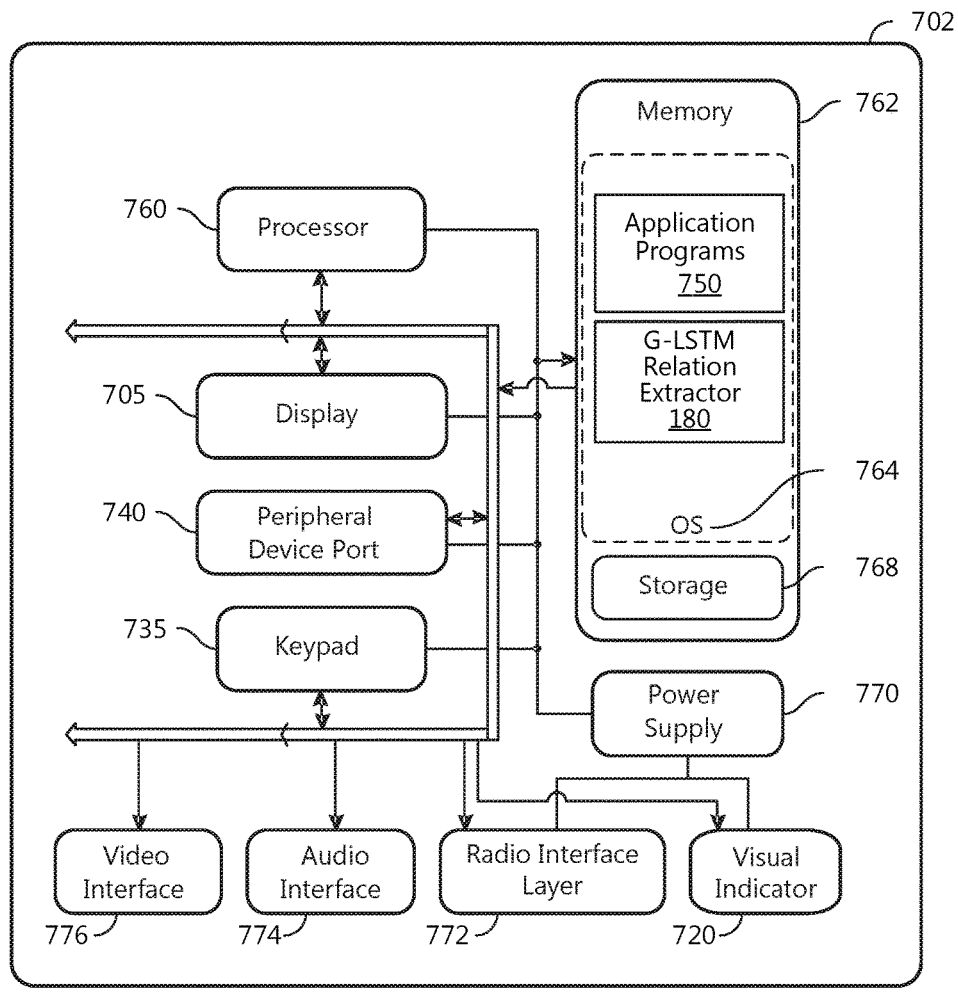
Figure 8:
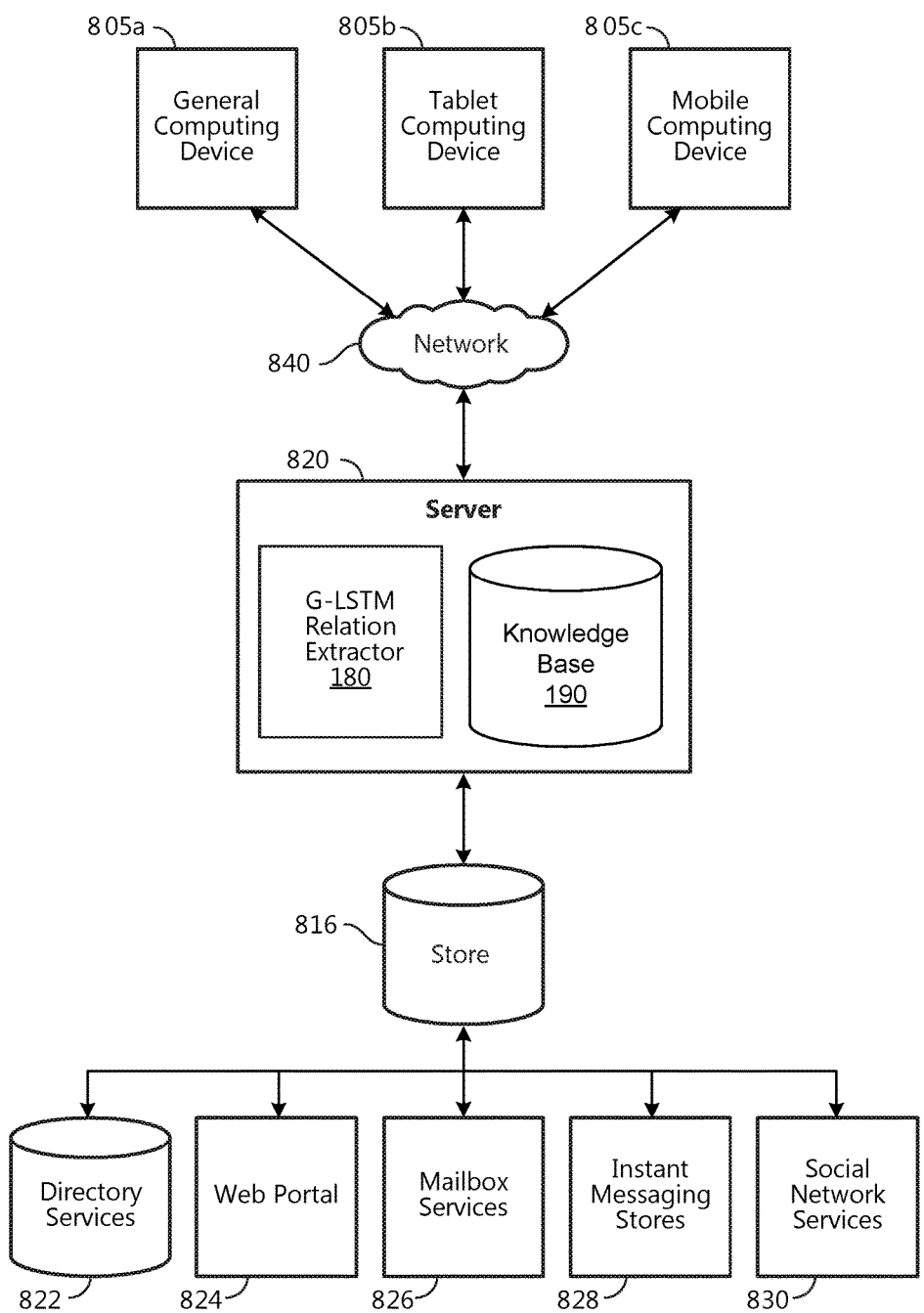
FIG. 8 is a block diagram of a distributed computing system.

FIGS. 6-8 and the associated descriptions provide a discussion of a variety of operating environments in which examples are practiced. However, the devices and systems illustrated and discussed with respect to FIGS. 6-8 are for purposes of example and illustration and are not limiting of a vast number of computing device configurations that are utilized for practicing aspects, described herein.

FIG. 6 is a block diagram illustrating physical components (i.e., hardware) of a computing device 600 with which examples of the present disclosure may be practiced. In a basic configuration, the computing device 600 includes at least one processing unit 602 and a system memory 604. According to an aspect, depending on the configuration and type of computing device, the system memory 604 comprises, but is not limited to, volatile storage (e.g., random access memory), non-volatile storage (e.g., read-only memory), flash memory, or any combination of such memories. According to an aspect, the system memory 604 includes an operating system 605 and one or more program modules 606 suitable for running software applications 650. According to an aspect, the system memory 604 includes graph LSTM relation extractor 180 and the knowledge base 190. The operating system 605, for example, is suitable for controlling the operation of the computing device 600. Furthermore, aspects are practiced in conjunction with a graphics library, other operating systems, or any other application program, and are not limited to any particular application or system. This basic configuration is illustrated in FIG. 6 by those components within a dashed line 608. According to an aspect, the computing device 600 has additional features or functionality. For example, according to an aspect, the computing device 600 includes additional data storage devices (removable and/or non-removable) such as, for example, magnetic disks, optical disks, or tape. Such additional storage is illustrated in FIG. 6 by a removable storage device 609 and a non-removable storage device 610.

As stated above, according to an aspect, a number of program modules and data files are stored in the system memory 604. While executing on the processing unit 602, the program modules 606 (e.g., graph LSTM relation extractor 180) perform processes including, but not limited to, one or more of the stages of the method 400 and 500 illustrated in FIGS. 4 and 5. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit utilizing a microprocessor, or on a single chip containing electronic elements or microprocessors. For example, aspects are practiced via a system-on-a-chip (SOC) where each or many of the components illustrated in FIG. 6 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 600 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 600 has one or more input device(s) 612 such as a keyboard, a mouse, a pen, a sound input device, a touch input device, etc. The output device(s) 614 such as a display, speakers, a printer, etc. are also included according to an aspect. The aforementioned devices are examples and others may be used. According to an aspect, the computing device 600 includes one or more communication connections 616 allowing communications with other computing devices 618. Examples of suitable communication connections 616 include, but are not limited to, radio frequency (RF) transmitter, receiver, and/or transceiver circuitry; universal serial bus (USB), parallel, and/or serial ports.

The term computer readable media, as used herein, includes computer storage media. Computer storage media include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (i.e., memory storage.) According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. According to an aspect, any such computer storage media is part of the computing device 600. Computer storage media do not include a carrier wave or other propagated data signal.

According to an aspect, communication media are embodied by computer readable instructions, data structures, program modules, or other data in a modulated data signal, such as a carrier wave or other transport mechanism, and include any information delivery media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

FIGS. 7A and 7B illustrate a mobile computing device 700, for example, a mobile telephone, a smart phone, a tablet personal computer, a laptop computer, and the like, with which aspects may be practiced. With reference to FIG. 7A, an example of a mobile computing device 700 for implementing the aspects is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. According to an aspect, the display 705 of the mobile computing device 700 functions as an input device (e.g., a touch screen display). If included, an optional side input element 715 allows further user input. According to an aspect, the side input element 715 is a rotary switch, a button, or any other type of manual input element. In alternative examples, mobile computing device 700 incorporates more or fewer input elements. For example, the display 705 may not be a touch screen in some examples. In alternative examples, the mobile computing device 700 is a portable phone system, such as a cellular phone. According to an aspect, the mobile computing device 700 includes an optional keypad 735. According to an aspect, the optional keypad 735 is a physical keypad. According to another aspect, the optional keypad 735 is a "soft" keypad generated on the touch screen display. In various aspects, the output elements include the display 705 for showing a graphical user interface (GUI), a visual indicator 720 (e.g., a light emitting diode), and/or an audio transducer 725 (e.g., a speaker). In some examples, the mobile computing device 700 incorporates a vibration transducer for providing the user with tactile feedback. In yet another example, the mobile computing device 700 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 700 incorporates peripheral device port 740, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one example of a mobile computing device. That is, the mobile computing device 700 incorporates a system (i.e., an architecture) 702 to implement some examples. In one example, the system 702 is implemented as a "smart phone" capable of running one or more applications (e.g., browser, e-mail, calendaring, contact managers, messaging clients, games, and media clients/players). In some examples, the system 702 is integrated as a computing device, such as an integrated personal digital assistant (PDA) and wireless phone.

According to an aspect, one or more application programs 750 are loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. According to an aspect, the graph LSTM relation extractor 180 and/or the knowledge base 190 (in whole or in part) is loaded into memory 762. The system 702 also includes a non-volatile storage area 768 within the memory 762. The non-volatile storage area 768 is used to store persistent information that should not be lost if the system 702 is powered down. The application programs 750 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700.

According to an aspect, the system 702 has a power supply 770, which is implemented as one or more batteries. According to an aspect, the power supply 770 further includes an external power source, such as an AC adapter or a powered docking cradle that supplements or recharges the batteries.

According to an aspect, the system 702 includes a radio 772 that performs the function of transmitting and receiving radio frequency communications. The radio 772 facilitates wireless connectivity between the system 702 and the "outside world," via a communications carrier or service provider. Transmissions to and from the radio 772 are conducted under control of the operating system 764. In other words, communications received by the radio 772 may be disseminated to the application programs 750 via the operating system 764, and vice versa.

According to an aspect, the visual indicator 720 is used to provide visual notifications and/or an audio interface 774 is used for producing audible notifications via the audio transducer 725. In the illustrated example, the visual indicator 720 is a light emitting diode (LED) and the audio transducer 725 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. According to an aspect, the system 702 further includes a video interface 776 that enables an operation of an on-board camera 730 to record still images, video stream, and the like.

According to an aspect, a mobile computing device 700 implementing the system 702 has additional features or functionality. For example, the mobile computing device 700 includes additional data storage devices (removable and/or non-removable) such as, magnetic disks, optical disks, or tape. Such additional storage is illustrated in FIG. 7B by the non-volatile storage area 768.

According to an aspect, data/information generated or captured by the mobile computing device 700 and stored via the system 702 are stored locally on the mobile computing device 700, as described above. According to another aspect, the data are stored on any number of storage media that are accessible by the device via the radio 772 or via a wired connection between the mobile computing device 700 and a separate computing device associated with the mobile computing device 700, for example, a server computer in a distributed computing network, such as the Internet. As should be appreciated such data/information are accessible via the mobile computing device 700 via the radio 772 or via a distributed computing network. Similarly, according to an aspect, such data/information are readily transferred between computing devices for storage and use according to well-known data/information transfer and storage means, including electronic mail and collaborative data/information sharing systems.

FIG. 8 illustrates one example of the architecture of a system for natural language relation extraction as described above. Content developed, interacted with, or edited in association with the graph LSTM relation extractor 180 or the knowledge base 190 is enabled to be stored in different communication channels or other storage types. For example, various documents may be stored using a directory service 822, a web portal 824, a mailbox service 826, an instant messaging store 828, or a social networking site 830. The graph LSTM relation extractor 180 is operative to use any of these types of systems or the like for natural language relation extraction, as described herein. According to an aspect, a server 820 provides the graph LSTM relation extractor 180 and/or the knowledge base 190 to clients 805*a,b,c*. As one example, the server 820 is a web server providing the graph LSTM relation extractor 180 over the web or allowing access to query the knowledge base 190 over the web. The server 820 provides the graph LSTM relation extractor 180 and the knowledge base 190 over the web to clients 805 through a network 840. By way of example, the client computing device is implemented and embodied in a personal computer 805*a*, a tablet computing device 805*b* or a mobile computing device 805*c* (e.g., a smart phone), or other computing device. Any of these examples of the client computing device are operable to obtain content from the store 816.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A method for analyzing natural language text based on linguistic relationships, comprising:
   receiving a graph long short term memory (LSTM) relation extractor;
   receiving a selection of documents to query for syntactic relationships;
   receiving a keyword tuple, the keyword tuple including multiple keywords and specifying a relationship between the keywords;
   parsing the selection of documents to discover natural language segments that include the keywords;
   in response to locating a given natural language segment, processing the segment according to the graph LSTM relation extractor to produce a relational score;
   determining whether the relational score satisfies a relationship threshold;
   in response to the relational score satisfying the relationship threshold, automatically returning the given natural language segment as responsive to the keyword tuple; and
   without user input, adding the natural language segment to a knowledge base configured for searching according to at least two of one or more of the keywords and the relationship.

2. The method of claim 1, wherein searching of the knowledge base by relationship improves an accuracy of returns for the search.

3. The method of claim 2, wherein the knowledge base is configured for multi-task learning, wherein the segment is added to the knowledge base according to a first tuple having a first number of keywords and knowledge base is configured to return the segment in response to a second tuple that includes a second number of keywords, wherein the second number is less than the first number.

4. The method of claim 1, wherein in response to multiple natural language segments being discovered when parsing a given document, a given segment of the multiple natural language segments in which the key terms are closer together is selected as the given natural language segment.

5. The method of claim 1, wherein the natural language segments include multiple sentences.

6. The method of claim 1, wherein processing the given natural language segment according to the graph LSTM relation extractor further comprises:
   determining linguistic relationships among words in the given natural language segment;
   associating each word of the words in the given natural language segment with a graph LSTM unit; and
   constructing, from multiple instances of the graph LSTM unit, an LSTM neural network according the semantic linguistic relationships, wherein each instance of the multiple instances receives input to a forget gate associated with a different instance of the graph LSTM unit associated with a term that precedes the word associated with the instance of the graph LSTM unit in the given natural language segment.

7. The method of claim 6, wherein the input received to the forget gate is weighted based on the linguistic relations of the term to the word in the given natural language segment.

8. The method of claim 6, wherein the graph LSTM unit includes:
   a plurality of forget gates, wherein each forget gate of the plurality of the forget gates is configured to accept a hidden vector from one associated predecessor graph LSTM unit in the LSTM neural network.

9. The method of claim 1, wherein the relationship threshold is produced by processing the keyword tuple according to the graph LSTM relation extractor based on linguistic relation among the keywords.

10. The method of claim 1, wherein the linguistic relations include endophors, further comprising:
    linking an endophor term to a cedent term; and
    substituting the endophor term for the cedent term when processing the segment according to the graph LSTM relation extractor.

11. A system for analyzing linguistic relationships in natural language text, comprising:
    a processor; and
    a memory storage device including instructions that when executed by the processor are operable to provide a plurality of graph long short term memory (LSTM) units arranged in an LSTM neural network to provide entity relationships in natural language text, wherein each graph LSTM unit of the plurality of graph LSTM units is associated with a word vector from the natural language text and includes:
      an input gate, operable to produce an input state by applying an input weight to the word vector and adding an input weighted sum of predecessor hidden vectors, wherein the predecessor hidden vectors are received from graph LSTM units preceding the graph LSTM unit in the LSTM neural network;
      an output gate, operable to produce an output state by applying an output weight to the word vector and adding an output weighted sum of the predecessor hidden vectors;
      a plurality of forget gates, wherein a number of forget gates equals a number of related words in a document segment associated with the word vector, wherein each forget gate of the plurality of forget gates is configured to receive an associated predecessor hidden vector from an associated predecessor graph LSTM unit in the LSTM neural network and to produce a forget state by applying a forget weight to the word vector and a weighting of the associated predecessor hidden vector;

a memory cell, operable to produce a memory state by multiplexing the input state with the word vector to which a memory weight is applied and a memory weighted sum of the predecessor hidden vectors is added, to which is added a sum of the forget weights produced by the plurality of forget gates multiplexed with an associated memory cell state of the associated predecessor graph LSTM units; and wherein the graph LSTM unit transmits a hidden vector to successor graph LSTM units in the LSTM neural network, wherein the hidden vector is produced by multiplexing the output state with the memory state.

12. The system of claim 11, wherein the input gate, output gate, and memory gate are further configured apply sigmoid squashing functions to compress the sum of the predecessor hidden vectors.

13. The system of claim 11, wherein the weighting of the associated predecessor hidden vector is based on a dependency type between a word associated with the graph LSTM unit and a term associated with the associated predecessor hidden vector.

14. The system of claim 11, wherein the input weight, the output weight, the forget weight, and the memory weight are equal for each graph LSTM unit of the plurality of graph LSTM units.

15. The system of claim 11, wherein the word vector is retrieved from a dictionary in response to recognizing an associated word in the natural language text.

16. The system of claim 15, wherein the associated word recognized in the natural language text is not found in the dictionary, the system is further operable to:

assign a value for the word vector; and add the associated word and the value to the dictionary.

17. A computer readable storage device including instructions for analyzing natural language text based on linguistic relationships, wherein the instructions comprise:

receiving a graph long short term memory (LSTM) unit;

receiving a training knowledge base, the training knowledge base including keywords that are associated according to a known relationship;

receiving a selection of documents;

parsing the selection of documents to discover natural language segments that include the keywords, wherein a first portion of the natural language segments exhibit the known relationship and a second portion of the natural language segments do not exhibit the known relationship; and training the graph LSTM unit over a series of epochs, in which training comprises:

for each of the natural language segments discovered:

identifying a linguistic structure of a given natural language segment;

forming a neural network of instances of the graph LSTM unit having a structure based on the linguistic structure;

processing the keywords according to the neural network to produce a relational score;

comparing the relational score to a relational threshold to determine whether the neural network indicates the given segment exhibits the known relationship; and for each epoch of the series of epochs, automatically adjusting at least one weighting of the graph LSTM unit for use in a next epoch of the series of epochs based on a number of the first portion determined to exhibit the known relationship and a number of the second portion determined to not exhibit the known relationship.

18. The computer readable storage device of claim 17, wherein the linguistic structure include endophors, further comprising:

linking an endophor term to a cedent term; and substituting the endophor term for the cedent term when processing the keywords according to the neural network.

19. The computer readable storage device of claim 17, wherein the graph LSTM unit is configured for multi-task learning to discover sub-relations, wherein the graph LSTM unit has been trained with a first tuple having a first number of keywords and the query tuple includes a second number of keywords, wherein the second number is less than the first number.

20. The computer readable storage device of claim 17, wherein the relationship threshold is produced by processing the keywords associated according to the known relationship from the training knowledge base according to a training neural network of instances of the graph LSTM unit structured according to the known relationship.

21. The computer readable storage device of claim 17, wherein processing the given natural language segment according to the neural network of instances of graph LSTM units further comprises:

determining linguistic relationships among words in the given natural language segment;

associating each word of the words in the given natural language segment with an instance of the graph LSTM unit; and wherein each instance of the graph LSTM unit receives input to a forget gate associated with a different instance of the graph LSTM unit associated with a term that precedes the word associated with the instance of the graph LSTM unit in the given natural language segment.

* * * * *